United States Patent [19]
Ang et al.

[11] Patent Number: 5,490,028
[45] Date of Patent: Feb. 6, 1996

[54] THIN FILM MAGNETIC HEAD INCLUDING AN INTEGRAL LAYERED SHIELD STRUCTURE

[75] Inventors: Jane Ang, San Mateo; Arun Malhotra, San Jose; G. Robert Gray, Fremont; James Watterston, Sunnyvale, all of Calif.

[73] Assignee: AIWA Research and Development, Inc., Fremont, Calif.

[21] Appl. No.: 297,183

[22] Filed: Aug. 26, 1994

[51] Int. Cl.⁶ .............................. G11B 5/11; G11B 5/147
[52] U.S. Cl. .................. 360/126; 360/119; 29/603
[58] Field of Search .................... 360/103, 104, 360/119–129; 29/603; 427/131

[56] References Cited

U.S. PATENT DOCUMENTS

| | | | |
|---|---|---|---|
| 3,723,665 | 3/1973 | Lazzari et al. | 179/100.2 C |
| 4,157,616 | 5/1983 | Bischoff | 360/126 |
| 4,414,554 | 11/1983 | Springer | 346/74.5 |
| 4,470,051 | 9/1984 | Springer | 346/74.5 |
| 4,494,125 | 1/1985 | Springer | 346/74.5 |
| 4,503,439 | 3/1985 | Springer | 346/74.5 |
| 4,503,440 | 3/1985 | Springer | 346/74.5 |
| 4,539,280 | 9/1985 | Springer | 430/39 |
| 4,544,421 | 10/1985 | Springer | 148/103 |
| 4,639,289 | 1/1987 | Lazzari | 156/643 |
| 4,809,103 | 2/1989 | Lazzari | 360/103 |
| 4,837,924 | 6/1989 | Lazzari | 29/603 |
| 4,901,177 | 2/1990 | Lazzari | 360/113 |
| 4,912,584 | 3/1990 | Mallary et al. | 360/126 |
| 4,942,490 | 7/1990 | Lehureau | 360/126 |
| 4,949,207 | 8/1990 | Lazzari | 360/119 |
| 4,970,615 | 11/1990 | Gau | 360/122 |
| 4,984,118 | 1/1991 | Springer | 360/125 |
| 4,992,897 | 2/1991 | Deroux-Dauphin | 360/103 |
| 5,020,212 | 6/1991 | Michijima et al. | 29/603 |
| 5,041,932 | 8/1991 | Hamilton | 360/104 |
| 5,065,271 | 11/1991 | Matsuura et al. | 360/126 |
| 5,073,242 | 12/1991 | Hamilton | 204/192.22 |

(List continued on next page.)

FOREIGN PATENT DOCUMENTS 4-119509  4/1992  Japan ..................................... 360/125

OTHER PUBLICATIONS

U.S. patent application Ser. No. 07/531,832 filed Jun. 1, 1990, entitled Unitary Read–Write Head Array For Magnetic Media, Inventor Gilbert D. Springer.

A. Sano, M. Egawa, M. Nitta, K. Takayanagi, T. Matsushita, and T. Fujita, A Low Inductance Metal–In–Gap Head Using a Side–Core Concept, ©1993, IEEE Transactions on Magnetics, vol. 29, No. 6, pp. 3888–3890.

K. L. Mittal, Factors Affecting Adhesion Of Lithographic Materials, Solid State Technology, May 1979, pp. 89–100.

J. P. Lazzari and P. Deroux–Dauphin, A New Thin Film Head Generation IC Head, IEEE Transactions on Magnetics, vol. 25, No. 5, Sep. 1989, pp. 3173–3193.

Primary Examiner—Stuart S. Levy
Assistant Examiner—Jefferson Evans
Attorney, Agent, or Firm—Skjerven, Morrill, MacPherson, Franklin & Friel; Mark P. Kahler

[57] ABSTRACT

A thin film magnetic head is fabricated on a substrate by depositing a lower shield layer on the substrate. A lower layer of a magnetic yoke is situated on the lower shield layer to couple the yoke to the shield. Alternatively, the magnetic yoke is isolated from the lower shield layer by an insulative layer therebetween. At the same time that first and second magnetic side poles are built up layer by layer via successive plating operations at the respective ends of a lower magnetic layer of the yoke, a side shield structure is plated up, layer by layer, at the periphery of the lower shield layer to surround resultant side pole structure. A shield cover is plated on the top of the side shield to substantially enclose the side pole structure, but leave an opening for an insulative pedestal though which the tops of the side poles extend. First and second magnetic poles are plated to the tops of the first and second side poles such that a gap region of non-magnetic material is formed therebetween.

21 Claims, 19 Drawing Sheets

U.S. PATENT DOCUMENTS

| | | | |
|---|---|---|---|
| 5,090,111 | 2/1992 | Lazzari | 29/603 |
| 5,111,351 | 5/1992 | Hamilton | 360/104 |
| 5,163,218 | 11/1992 | Hamilton | 29/603 |
| 5,166,845 | 11/1992 | Thompson et al. | 360/103 |
| 5,168,408 | 12/1992 | Lazzari | 360/113 |
| 5,189,580 | 2/1993 | Pisharody et al. | 360/126 |
| 5,195,006 | 3/1993 | Morikawa | 360/126 |
| 5,196,976 | 3/1993 | Lazzari | 360/113 |
| 5,198,948 | 3/1993 | Stover et al. | 360/124 |
| 5,202,863 | 4/1993 | Miyatake et al. | 369/13 |
| 5,208,716 | 5/1993 | Lazzari | 360/113 |
| 5,216,559 | 6/1993 | Springer | 360/106 |
| 5,224,260 | 7/1993 | Fedeli et al. | 29/603 |
| 5,260,845 | 11/1993 | Takayama et al. | 360/103 |
| 5,266,409 | 11/1993 | Schmidt et al. | 428/446 |
| 5,274,521 | 12/1993 | Miyauchi et al. | 360/119 |
| 5,363,265 | 11/1994 | Hsie et al. | 360/113 |

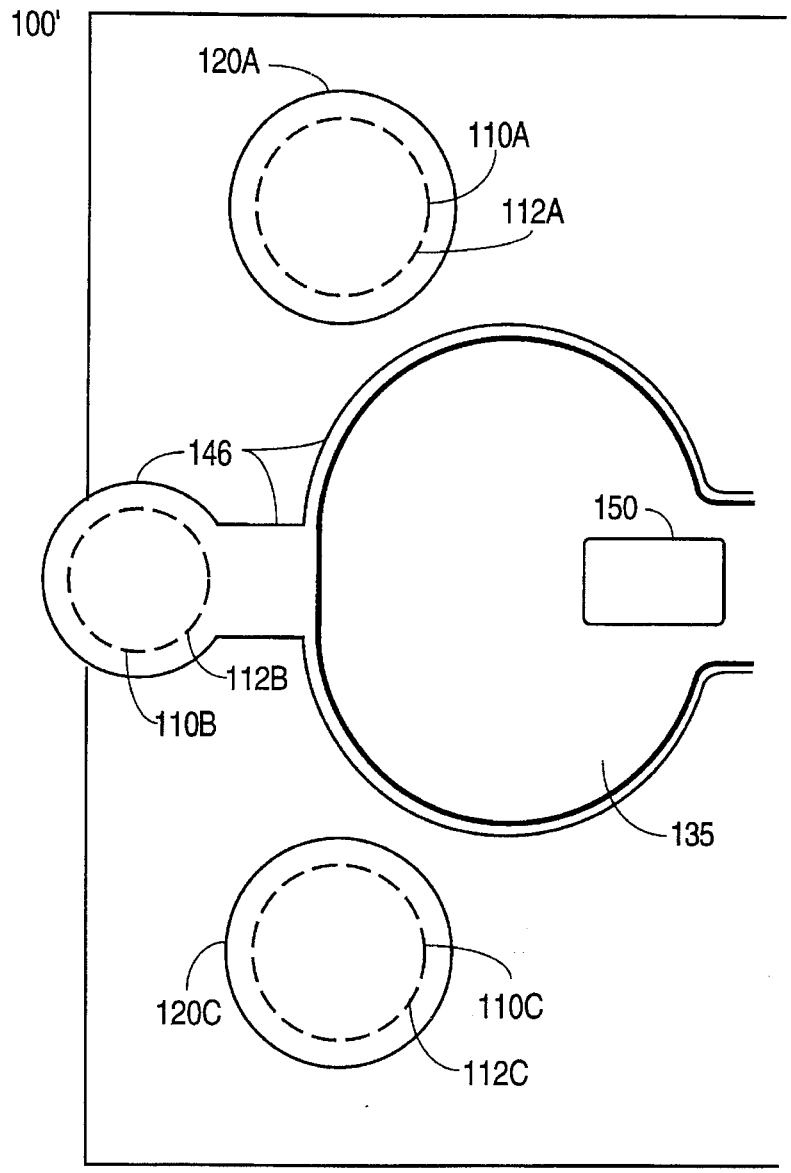
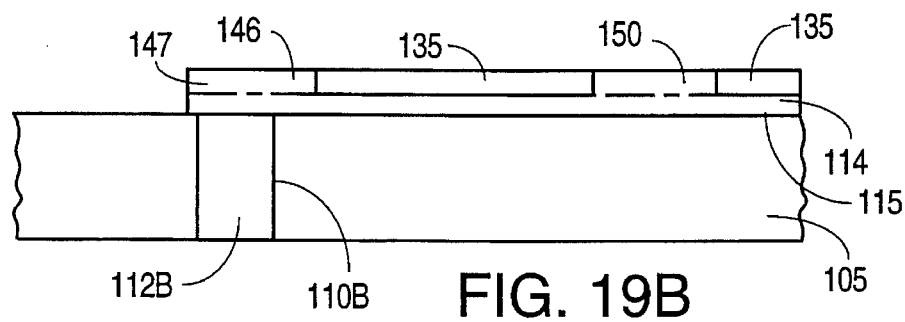
FIG. 19A
FIG. 19B

THIN FILM MAGNETIC HEAD INCLUDING AN INTEGRAL LAYERED SHIELD STRUCTURE

CROSS REFERENCE TO RELATED PATENT APPLICATIONS

This patent application is related to the patent application entitled "METHOD OF FABRICATING A THIN FILM MAGNETIC HEAD INCLUDING LAYERED MAGNETIC SIDE POLES", (U.S. application No. 08/297,186) by Malhotra et al., filed concurrently herewith and assigned to the same assignee, the disclosure of which is incorporated herein by reference.

BACKGROUND OF THE INVENTION

1. Field of the Invention

This invention relates in general to magnetic recording and playback heads and, more particularly, to thin film magnetic recording and playback heads which employ shielding.

2. Description of Related Art

In the continuing drive for increased storage density in magnetic media storage devices, thin film magnetic heads have been developed. As opposed to earlier types of magnetic heads, the fabrication of which involves significant piecework and manual handling of individual parts, thin film magnetic heads take advantage of semiconductor fabrication processes to form a large number of heads simultaneously on a common substrate or wafer.

One such head which is formed by a semiconductor thin film process is disclosed in the article, "A New Thin Film Head Generation IC Head" by J. P. Lazzari et al., IEEE Transactions on Magnetics, Vol. 25, No. 5, September 1989. A cross-sectional view of the Lazzari head is illustrated in FIG. 1 as head 10. Head 10 is fabricated within a recess 15 in a silicon substrate 20. A gap 25 is shown in the uppermost portion of a magnetic layer or yoke 30 situated within recess 15. Head 10 is shown positioned adjacent magnetic recording media 35. A magnetic coil 40 is wound around magnetic yoke 30. A plurality of sliders with respective heads 10 thereon are fabricated from a common silicon wafer substrate using semiconductor thin film processes. The sliders are then diced up into individual slider assemblies.

To attenuate the amplitude of undesired signals which might otherwise reach a recording/playback head, shielding can be used between the head and the potential noise source. Unfortunately, providing separate shield structures between head and noise sources can contribute significantly to the ultimate cost of the head.

SUMMARY OF THE INVENTION

One advantage of the thin film head of the present invention is that the head is shielded from undesired noise sources which could otherwise contaminate the recording and playback signal associated with the head.

Another advantage of the thin film head of the present invention is that shielding is integrated within the thin film head itself.

Yet another advantage of the thin film head of the present invention is a narrow gap width which results in correspondingly high density magnetic recording capabilities.

Still another advantage of the thin film head of the present invention is that the disclosed head can be fabricated in large quantities using thin film semiconductor fabrication equipment.

In accordance with one embodiment of the present invention, a thin film magnetic head is provided which includes a substrate and a bottom shield layer situated on the substrate. The bottom shield layer includes a peripheral edge surface. The head includes an electrically insulative layer situated on the bottom shield layer. The head also includes a lower magnetic layer situated on the insulative layer. The lower magnetic layer includes first and second ends. The head also includes first and second layered side pole members of magnetic material situated at the first and second ends, respectively, of the lower magnetic layer, the first and second side pole members including tops and bottoms. The head further includes a layered electrically insulative body situated about the first and second side poles. The head still further includes a coil structure situated within the insulative body and around one of the first and second side pole members. The thin film head also includes an insulative pedestal situated at the tops of the first and second side pole members, the insulative pedestal extending above the plane of the insulative body below and surrounding the tops of the first and second side pole members. The thin film also includes a layered side shield situated atop the peripheral edge surface of the bottom shield layer and substantially surrounding the insulative body. The head also includes a shield cover situated atop the side shield and covering the insulative body and coil structure, the shield cover including an opening through which the pedestal protrudes. The head also employs a first upper magnetic pole element situated at the upper end of the first magnetic side pole and including a first gap end facing the second magnetic side pole. The head further includes a second upper magnetic pole element situated at the upper end of the second magnetic side pole and including a second gap end facing the first gap end. The thin film head employs a-gap region of nonmagnetic material situated between the first gap end and the second gap end.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

FIG. 19A is a top view of an intermediate stage in the fabrication of an alternative embodiment of the thin film magnetic head.

FIG. 19B is a cross sectional view of the thin film magnetic head of FIG. 19A.

DETAILED DESCRIPTION OF THE INVENTION

Figure 1:
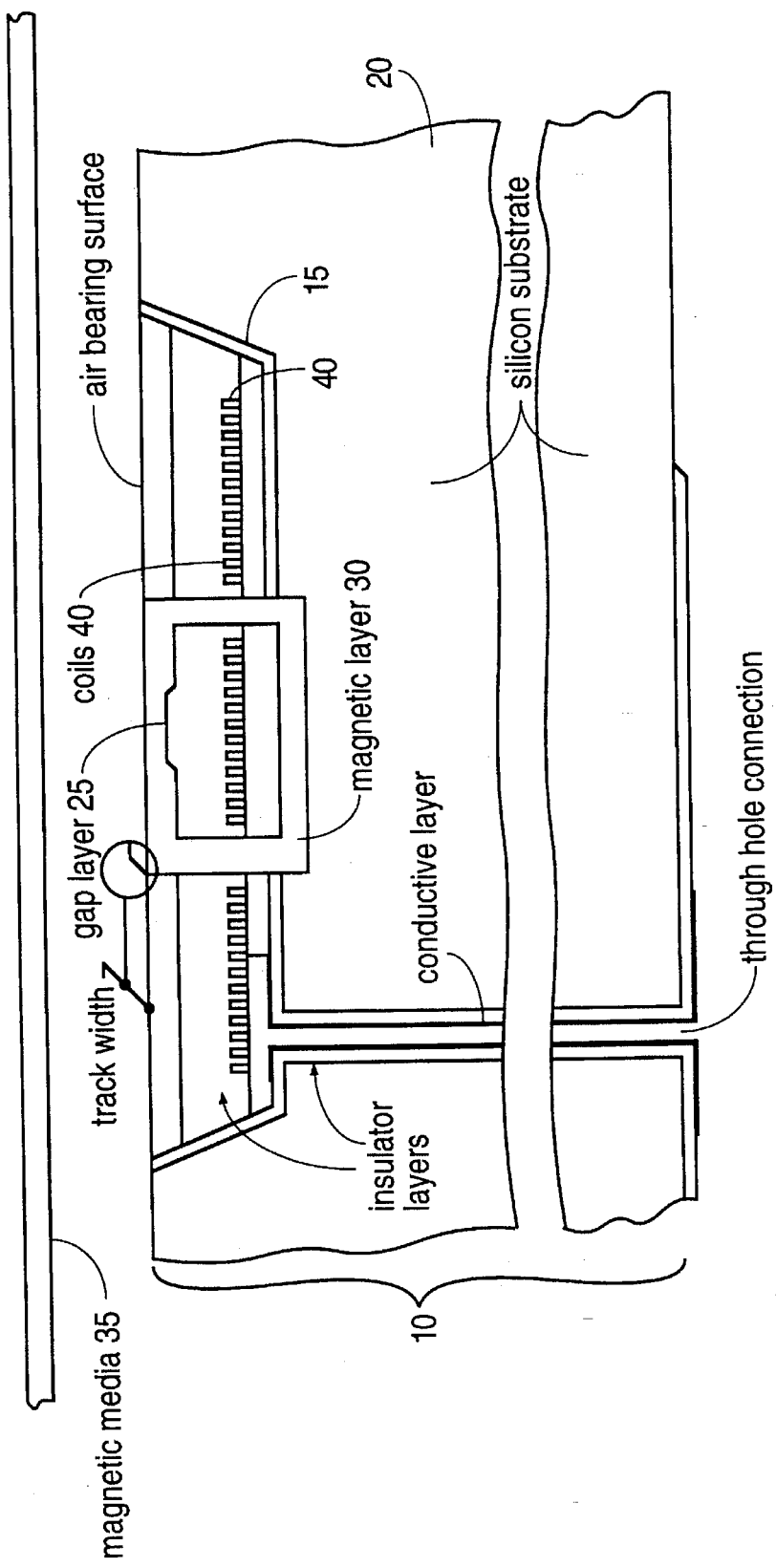
FIG. 1 is a cross section of a conventional thin film magnetic head.
Figure 2A:
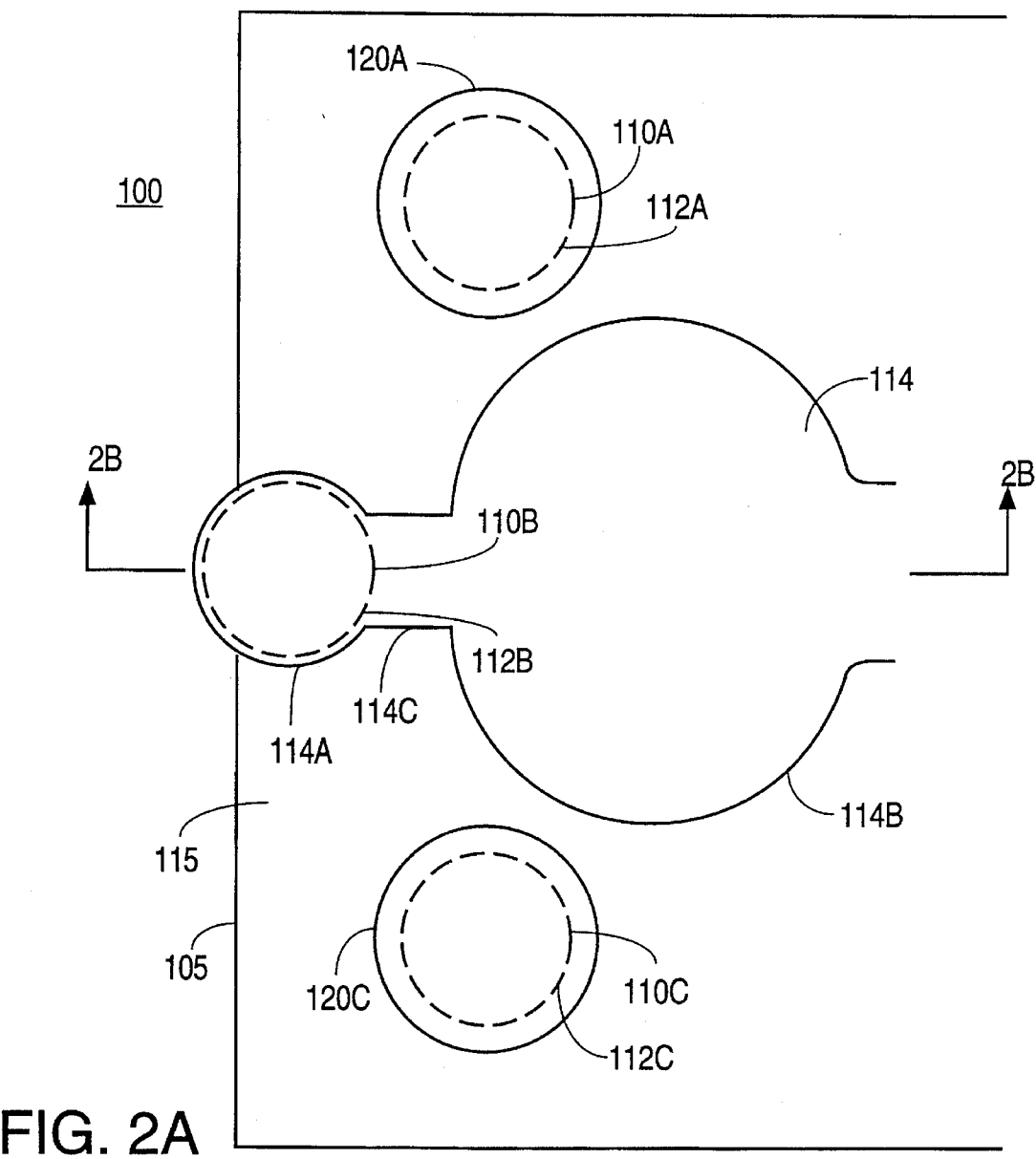
FIG. 2A is a plan view of a substrate with via holes and showing a shield employed by one embodiment of the magnetic head of the invention.
Figure 2B:
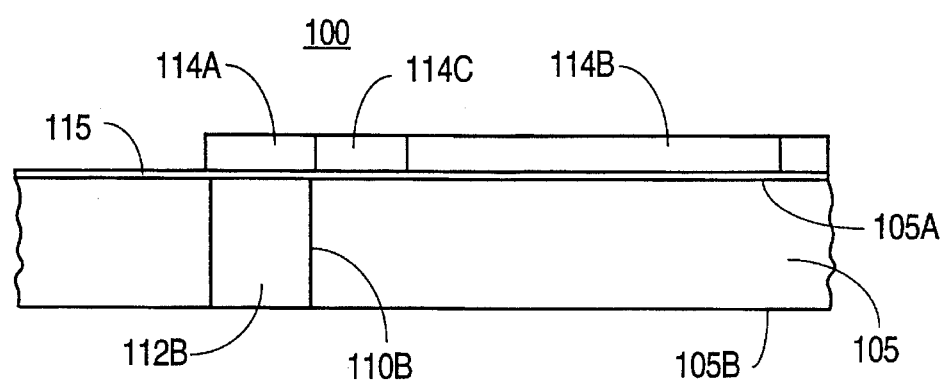
FIG. 2B is a cross section of the magnetic head of FIG. 2A taken along section line 2B—2B.
Figure 3A:
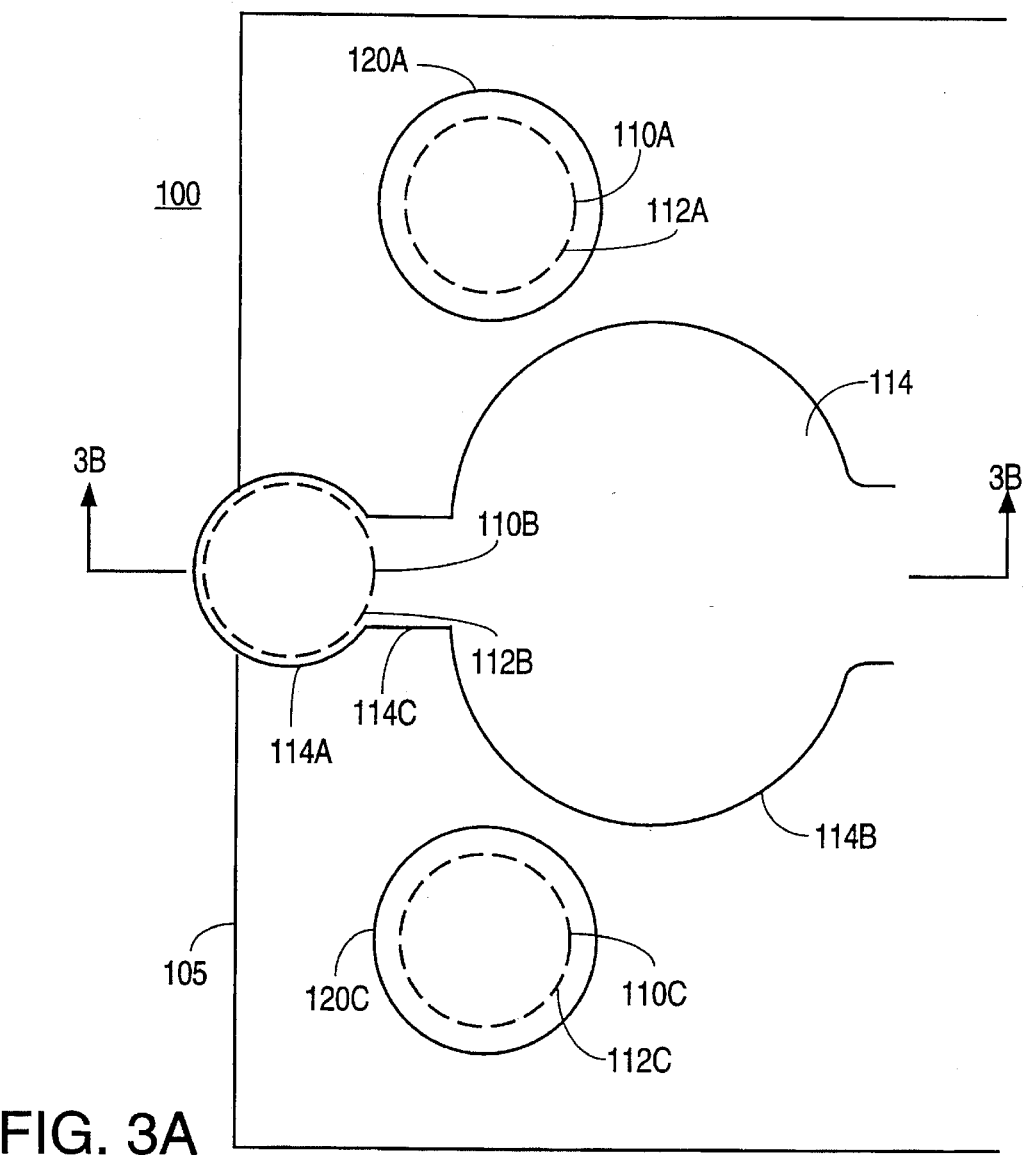
FIG. 3A is a plan view of the magnetic head of FIG. 2A with a bottom shield layer.
Figure 3B:
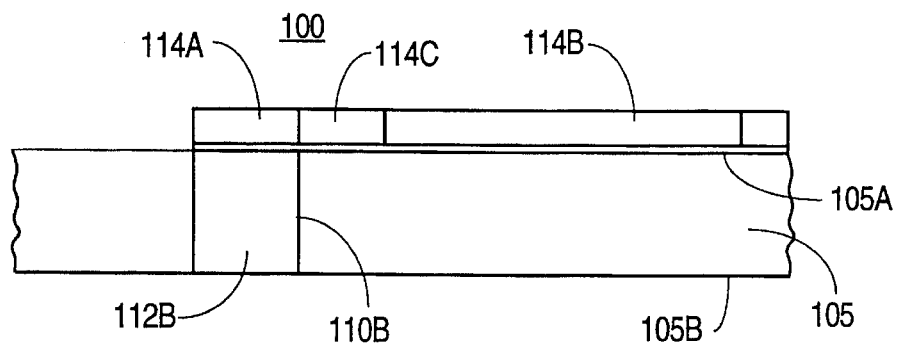
FIG. 3B is a cross section of the magnetic head of FIG. 3A taken along section line 3B—3B.

FIG. 2A is a top plan view of a portion of a thin film head 100 which is situated on an insulative substrate 105 such as a ceramic, alumina or other nonconductive substrate. Substrate 105 includes opposed major surfaces 105A and 105B. Via holes 110A, 110B and 110C are formed in substrate 105 and are filled with an electrically conductive material to create conductive paths through substrate 105 at the locations shown. Laser drilling or other high precision via formation technique may be employed to form via holes 110A, 110B and 110C. Via holes 110A, 110B and 110C are filled with an electrically conductive material such as plated copper, thick film processed gold, or sintered tungsten and copper, for example, to form via connective members 112A, 112B and 112C. Connective members 112A and 112C will subsequently be coupled to the ends of a coil structure and connective member 112B will be coupled to a shield structure. In actual practice, substrate 105 is a wafer on which the FIG. 2A pattern is replicated thousands of times so that thousands of heads can be efficiently manufactured from a single wafer.

A seed layer 115 of electrically conductive material is sputtered on substrate surface 105A. A material suitable for plating, in other words a material upon which plating can be conducted, is selected as seed layer 115. For example, seed layer 115 may be fabricated from Cr-NiV, namely, a chrome or other adhesion-promoting layer followed by a non-magnetic nickel-vanadium 7% film.

Via caps 120A and 120C are patterned atop via connective members 110A and 110C, respectively, via plating on seed layer 115 using photolithographic techniques as shown in FIG.'s 2A and 2B. More specifically, to pattern via caps 120A and 120C, a photoresist layer (not shown) is deposited on seed layer 115 and patterned to include openings above connective members 112A and 112C at which the formation of respective via caps 120A and 120C is desired. Plating is then conducted in these openings using seed layer 115 as the seed. The photoresist is then removed, thus leaving patterned via caps 120. As used in this document, the term "patterning" will mean the formation of a particular layer such that the layer exhibits a specified pattern, such as described with respect to the formation of via caps 120 above, for example.

Via caps 120A and 120C can be fabricated from NiFe by any suitable deposition or plating process. It is noted that later in the process described herein, portions of seed layer 115 will be removed by sputter etching. While in the particular example described, via caps 120A and 120C are fabricated from NiFe, in actual practice via caps 120A and 120C can be fabricated from other conductive materials which would not be attacked by the particular etchant used to later remove seed layers 185, 230 and 275. The exposed seed layer is then removed by sputter etching.

At the same time that via caps 120A and 120C are formed, bottom shield 114 is also fabricated. Bottom shield 114 is conveniently fabricated from the same material as via caps 120A and 120C such as NiFe although other metallic materials suitable for shielding may also be employed.

Shield 114 can be fabricated from any soft magnetic material. Bottom shield 114 includes a cap portion 114A which covers via connective member 112B. Bottom shield 114 also includes a main shield base portion 114B upon which the head structure will be subsequently fabricated. Bottom shield 114 further includes a connective portion 114C which electrically couples cap portion 114A to main shield base portion 114B as shown in FIG. 2A.

Since bottom shield 114 can be conveniently fabricated at the same time that via caps 120A and 120C are fabricated, the same photoresist layer (not shown) which is used to make via caps 120A and 120C is patterned to include openings for not only the plating of via caps 120A and 120C, but also an opening for the plating of bottom shield cap portion 114A, bottom shield main base portion 114B and shield connective portion 114C. Shield 114 is then plated at the same time as via caps 120A and 120C. The photoresist layer is then removed. The exposed seed layer 115 is then sputter etched to remove seed layer 115 except for the portions thereof below via caps 120A and 120C and shield 114.

Figure 4A:
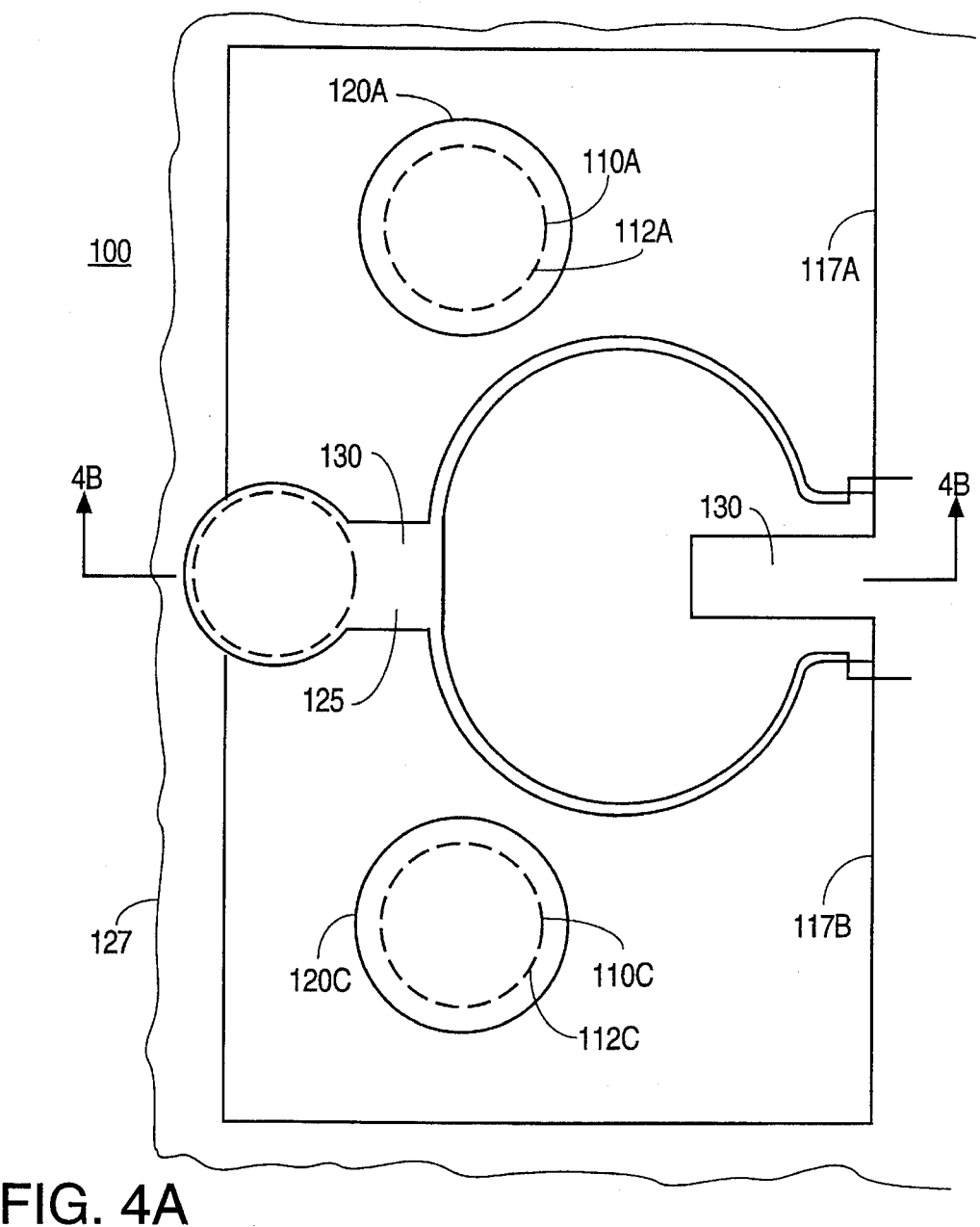
FIG. 4A is a plan view of the magnetic head of FIG. 3A with an insulative layer and seed layer thereon.
Figure 4B:
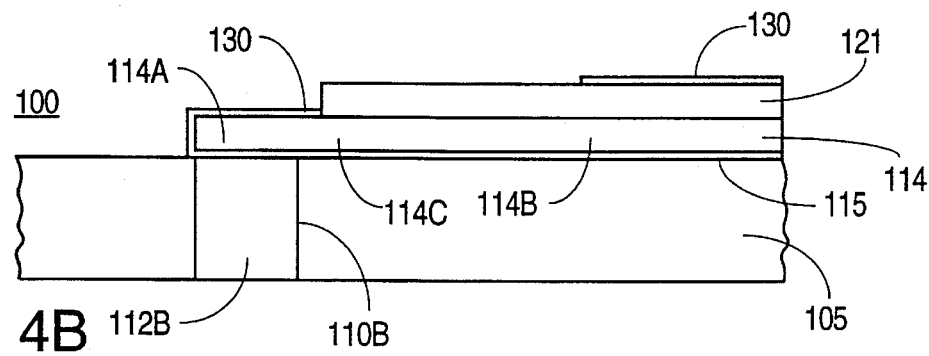
FIG. 4B is a cross sectional view of the magnetic head of FIG. 4A taken along section line 4B—4B.

An electrically insulative base layer 121 is patterned on the upper surface of shield 114 of head 100 as shown in FIG. 4A and 4B. In this particular embodiment, insulative base layer 121 is formed from photoresist. Insulative base layer 121 covers bottom shield main base portion 114B. Insulative base layer 121 is electron beam cured.

A seed layer 130 of metallic material such as Cr-NiV is formed by using a lift-off process wherein a layer of photoresist (not shown) is patterned to cover areas 117A and 117B of FIG. 4A. Cr-NiV seed layer 130 is then sputtered over head 100. The photoresist is then stripped thus lifting off the sputtered Cr-NiV film from areas 117A and 117B. The remaining portion of seed layer 130 forms a ground structure 125 as shown in FIG. 4A. In FIG. 4A, a wavy line 127 is drawn exterior to head 100 to indicate that head 100 is being fabricated on a wafer or substrate which is in common with other similarly fabricated heads.

An electrically insulative layer 135 is patterned and electron beam cured on the upper surface of head 100 as shown in FIG.'s 5A and 5B. One material which may be employed to fabricate insulative layer 135 is photoresist. Insulative layer 135 is patterned atop insulative base layer 121 and seed layer 130. Insulative layer 135 includes an open region 140 which will receive the bottom of magnetic yoke 145 as later described.

Figure 5A:
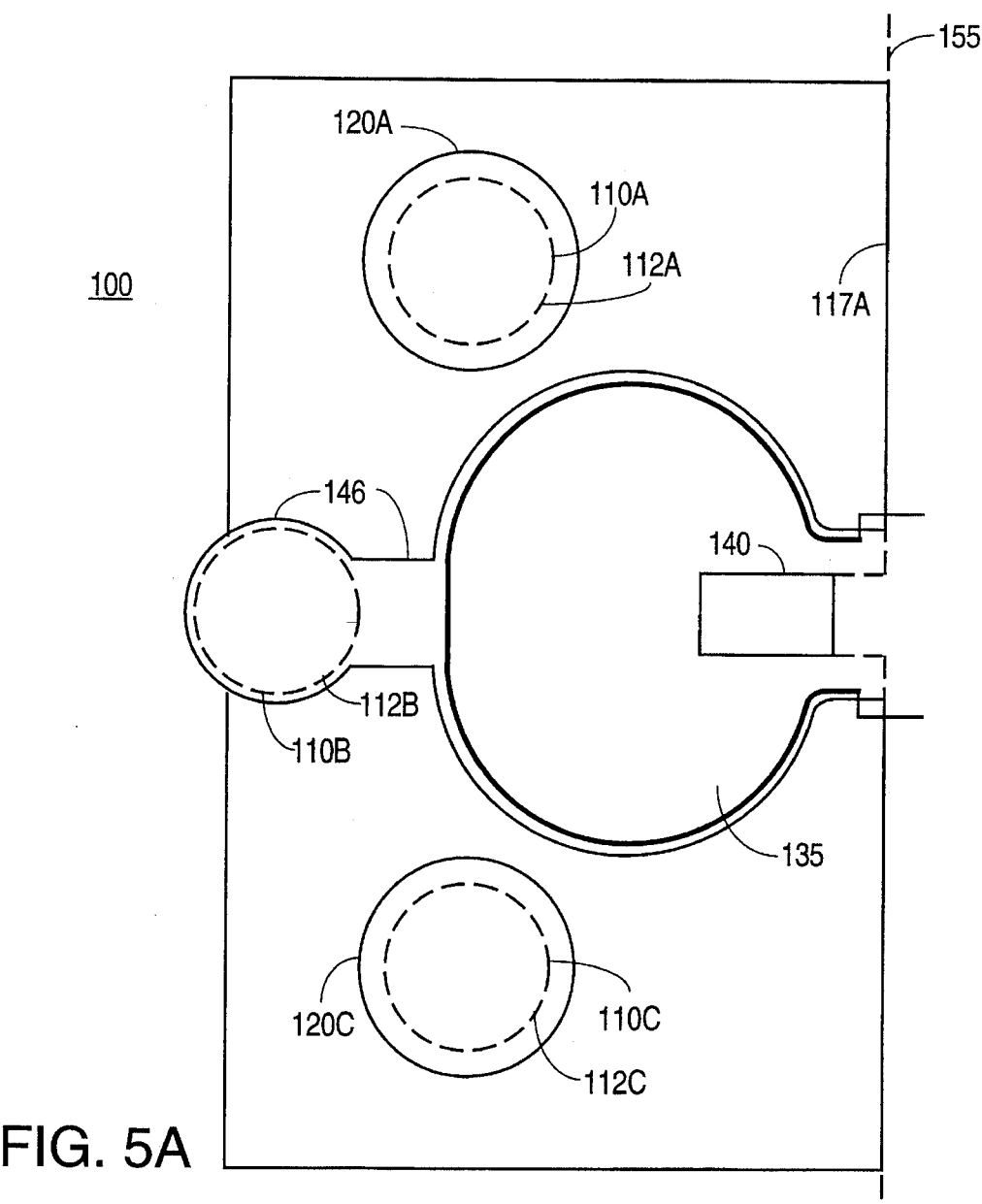
FIG. 5A is a plan view of the magnetic head of FIG. 4A showing the formation of a side shield and a seed layer with an opening therein.
Figure 5B:
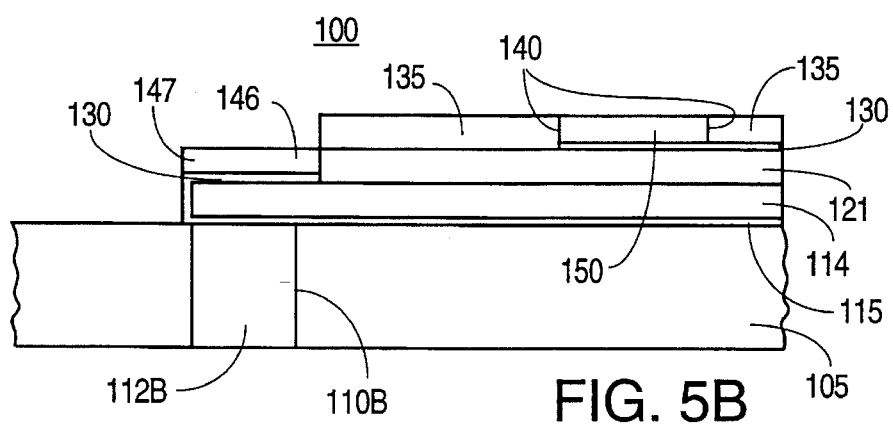
FIG. 5B is a cross sectional view of the magnetic head of FIG. 5A taken along section line 5B—5B.

The bottom magnetic layer 150 of magnetic yoke 145 and the bottom layer 146 of a side shield 147 are plated at the same time. For ease of fabrication, bottom magnetic layer 150 and side shield 147 are plated from the same material, for example, NiFe. Bottom magnetic layer 150 is plated up to a plane substantially level with the top of insulative layer 135. To plate bottom magnetic layer 150 and bottom layer 146, the remainder of the upper surface of head 100 is masked with protective photoresist except for these regions. Plating is then conducted and the photoresist is removed thus leaving bottom magnetic layer 150 and bottom shield layer 146 as shown in FIG. 5B. It is noted that side shield 147 is built up from a series of layers (later described), of which layer 146 is the first, to substantially surround insulative layer 135 and the structures which are subsequently fabricated thereon.

Figure 6:
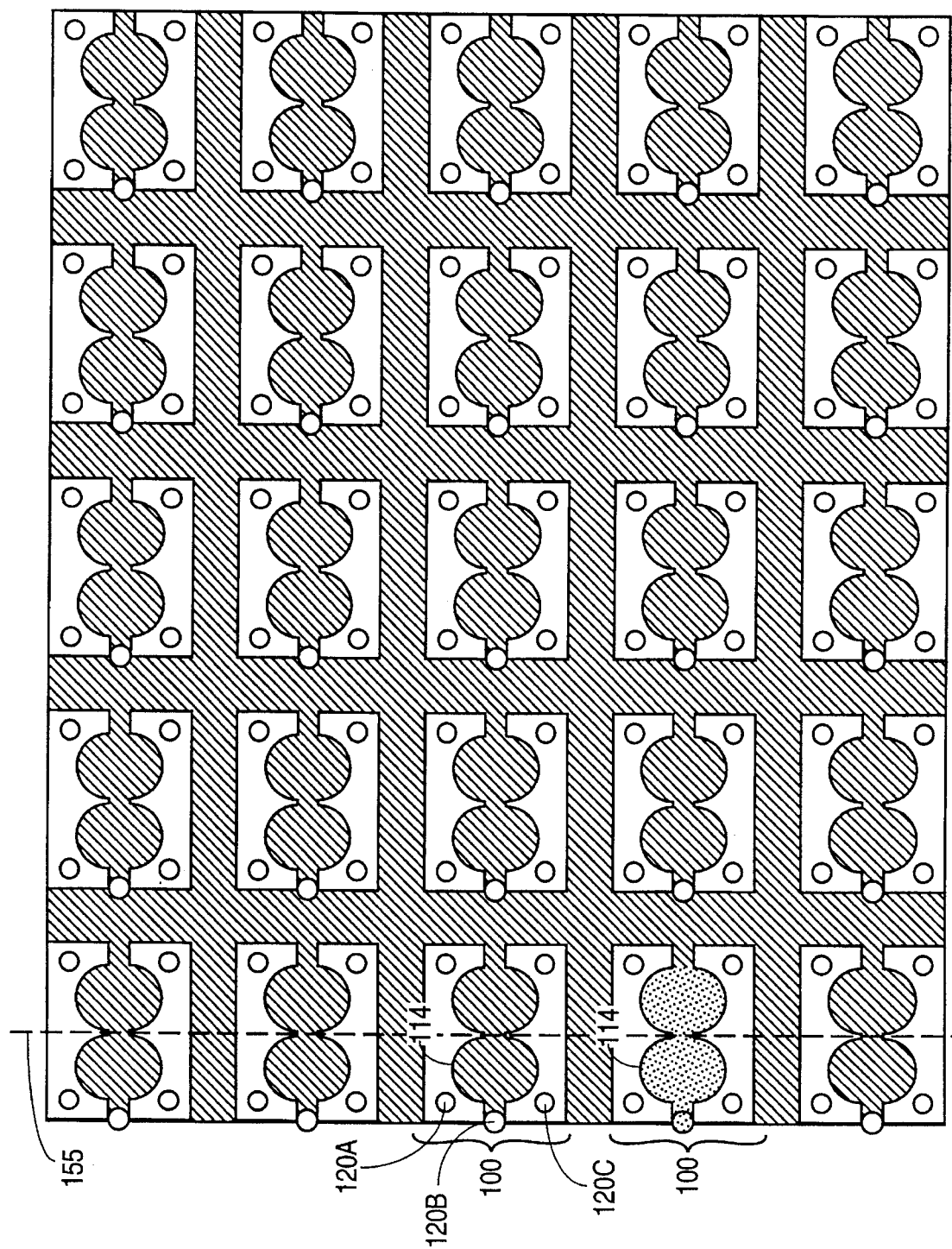
FIG. 6 illustrates a plurality of magnetic heads being fabricated on a common substrate.

For convenience, one half of head 100 is depicted in FIG. 2A and the subsequent figures. It should be understood that substantially the same structure as shown in FIG. 2A and the subsequent figures is repeated to form the actual head. More particularly, in the particular embodiment shown, head 100 is symmetric about major axis 155 such that head 100 actually includes two recording or playback portions as shown in FIG. 6. In actual practice, a plurality of heads 100 are fabricated simultaneously on a common semiconductor substrate 105 as shown in FIG. 6. For example, several thousand heads may be fabricated at the same time on the same substrate. FIG. 6 illustrates head 100 in an earlier state of fabrication wherein shield 114 is formed.

Figure 7A:
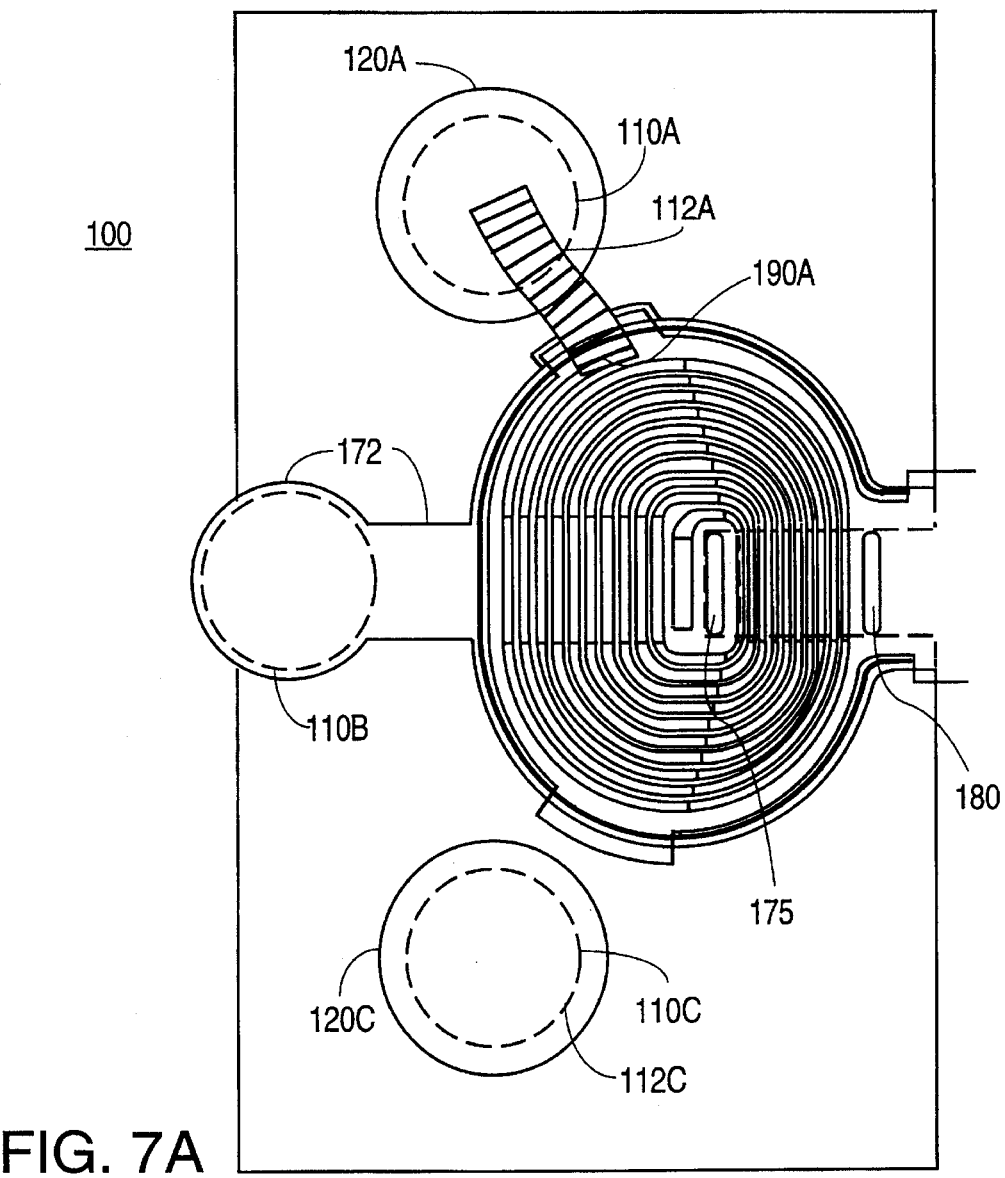
FIG. 7A is a plan view of the magnetic head showing an early stage of side pole build-up and the formation of first coil layer.
Figure 7B:
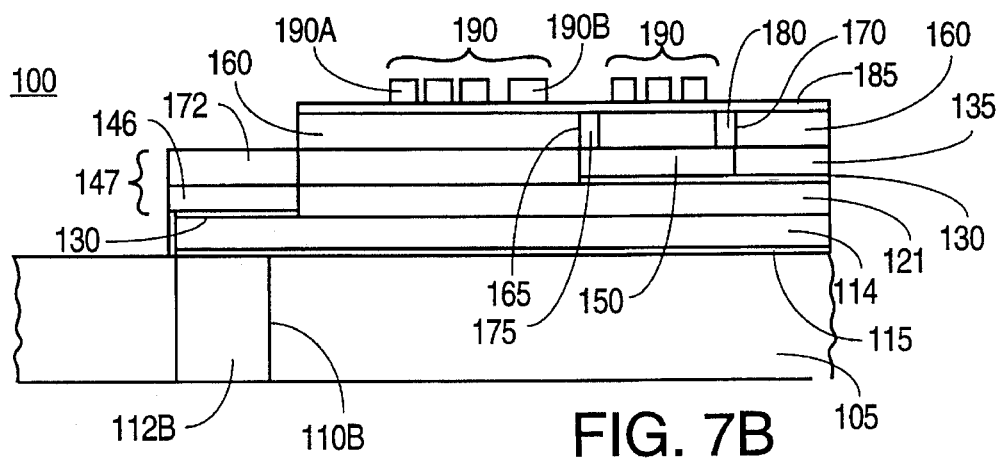
FIG. 7B is a cross sectional view of the magnetic head of FIG. 7A taken along section line 7B—7B.
Figure 8A:
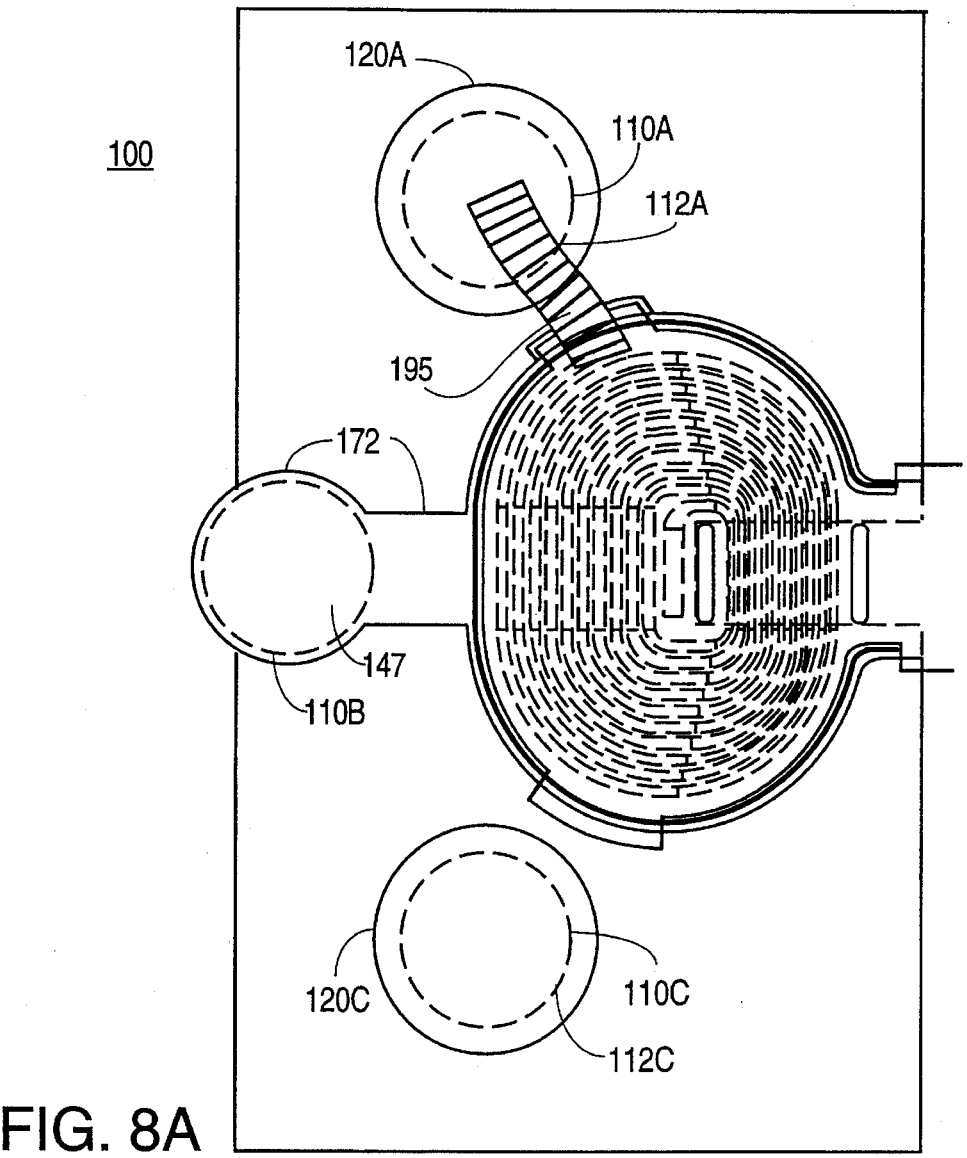
FIG. 8A is a plan view of the magnetic head of FIG. 7A showing the formation of an insulative layer on the lower coil structure.
Figure 8B:
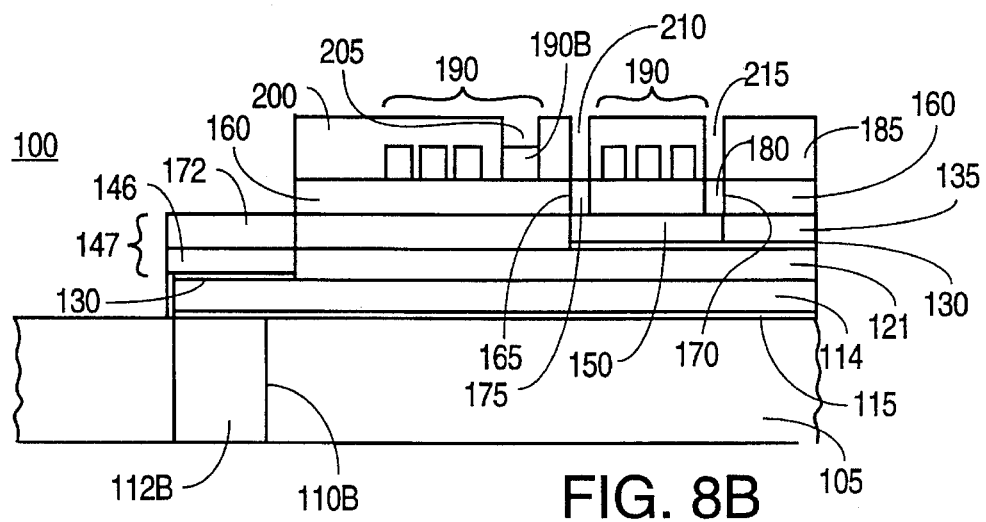
FIG. 8B is a cross sectional view of the magnetic head of FIG. 8A taken along section line 8B—8B.

An insulative layer 160 of photoresist is patterned on head 100 as shown in FIG. 7A and 7B leaving open regions 165 and 170 in which respective magnetic side poles will subsequently be built up. Insulative layer 160 is electron beam cured to provide a planar surface as illustrated. In more detail, a magnetic side pole portion 175 is plated in open region 165 up to a height which is level with the top of insulative layer 160, and a magnetic side pole portion 180 is plated in open region 170 up to a height which is level with the top of insulative layer 160. At the same time that magnetic side pole portions 165 and 170 are being plated, side shield layer 172 of side shield 147 is plated atop side shield layer 146. To plate magnetic side pole portions 165 and 170 and side shield layer 172, the remainder of the upper surface of head 100 except for the regions in which these structures are to be formed is covered with a patterned photoresist layer (not shown). The photoresist layer is removed subsequent to plating, thus leaving the structure shown in FIG. 7B.

A seed layer 185 is sputtered on insulative layer 160 of the partially formed head 100 to form a plating base for a lower coil layer 190 as shown in FIG. 7B. One material which is used to fabricate seed layer 185 is CrCu. Lower coil layer 190 is patterned by copper plating on seed layer 185 as shown. In more detail, to pattern coil layer 190, a photoresist layer (not shown) is deposited on seed layer 185. This photoresist layer includes open regions at those locations on seed layer 185 where formation of lower coil layer 190 is desired. The open regions in this photoresist layer are then plated up with copper to form lower coil layer 190. The photoresist layer is removed and head 100 is then etched to remove seed layer 185 from those portions of head 100 not protected by coil layer 190. For convenience, the remaining portions of seed layer 185 are omitted in subsequent illustrations.

Lower coil layer 190 includes a connective strip 195 made of electrically conductive material which couples an end 190A of coil layer 190 to the via cap 120A of via connective member 112A. Copper plating may be used to fabricate connective strip 195. The remaining end 190B of lower coil layer 190 is located at the center of the lower coil.

The earlier described insulative layer 160 provides a planar surface for the structures fabricated thereon. Insulative layer 160 also provides electrical isolation between coil layer 190 and bottom layer 150 of magnetic yoke 145. Moreover, insulative layer 160 isolates the connective strip 195 from the shield. Insulative layer 160 also serves to provide opening for the magnetic side poles and a boundary for the shield.

An insulative layer 200 of photoresist is patterned on head 100 above lower coil layer 190 leaving an open region 205 for access to coil end 190B as shown in FIG.'s 8A and 8B. Insulative layer 200 is also patterned to leave open regions 210 and 215 above side pole portion 175 and side pole portion 180, respectively. Insulative layer 200 is electron beam cured. Layer 200 electrically isolates lower coil layer 190 from structures subsequently placed above layer 190.

Magnetic side pole portions 220 and 225 are plated on side pole portions 175 and 180, respectively, as shown in FIG.'s 9A and 9B. Side pole portions 220 and 225 are plated with a magnetic material such as NiFe up to a level even with that of insulative layer 200. At the same time that magnetic side pole portions 220 and 225 are plated, side shield layer 222 of side shield 147 is plated atop side shield layer 172 as shown in FIG. 9B. In this particular embodiment, both side pole portions 220 and 225 are fabricated from magnetic material such as NiFe. To actually conduct the plating operation which forms side pole portions 220, 225 and side shield 222, the remainder of the upper surface of head 100 except for these regions is covered with a layer of patterned photoresist (not shown). Plating is then carried out at side pole portions 220, 225 and side shield 222. The photoresist layer is then removed.

A seed layer 230 is sputtered on insulative layer 200 of the partially formed head 100 of FIG. 9B to form a plating base for an upper coil layer 235. One material which is used to fabricate seed layer 230 is CrCu.

Figure 9A:
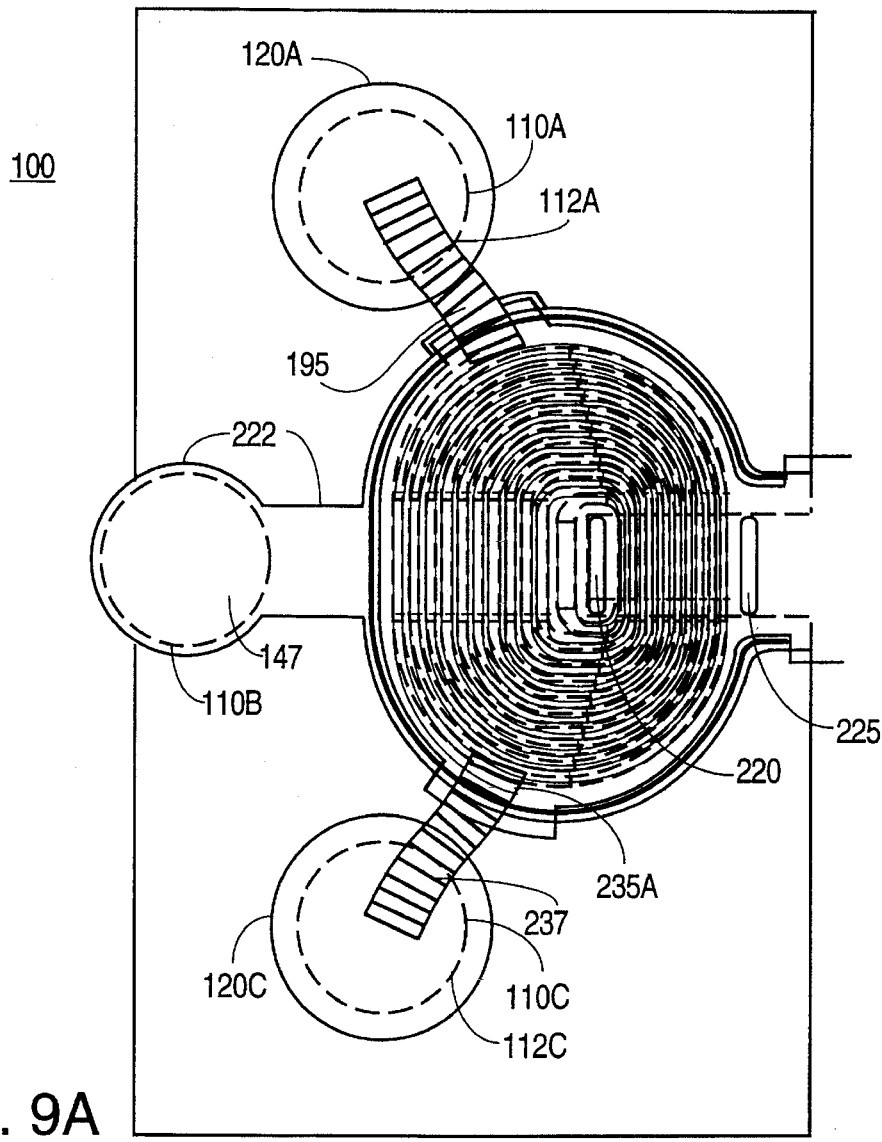
FIG. 9A is a plan view of the magnetic head of FIG. 8A showing placement of an upper coil structure thereon.
Figure 9B:
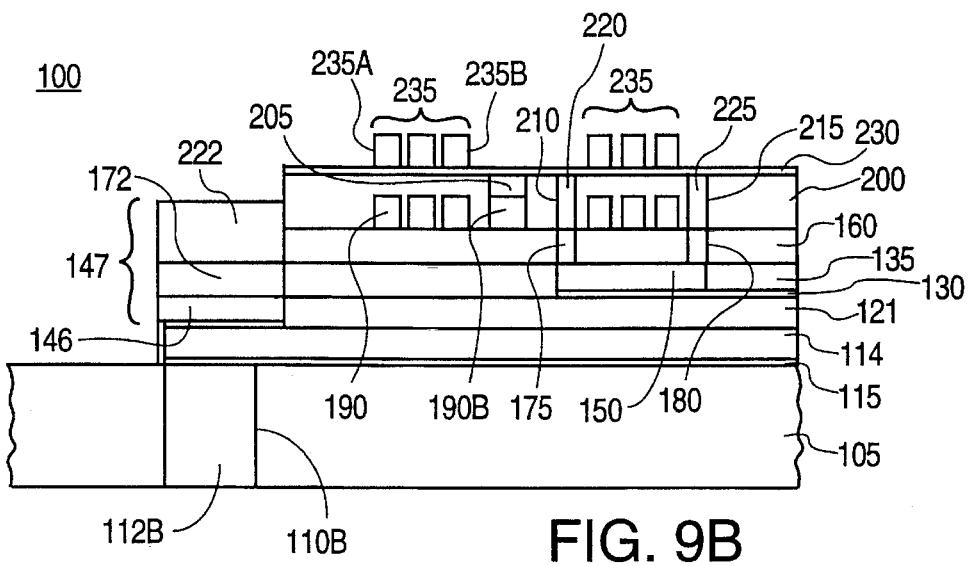
FIG. 9B is a cross sectional view of the magnetic head of FIG. 9A taken along section line 9B—9B.

Upper coil layer 235 is patterned and copper plated on seed layer 230 as shown in FIG. 9A and 9B. FIG. 9B is a simplified cross-section of head 100 at the described stage of fabrication in which structures in back of upper coil layer 235 are not shown in order to emphasize upper coil layer 235. In this particular embodiment, upper coil layer 235 is substantially similar in geometry to lower coil layer 190 and is fabricated using substantially the same technique. However, other coil arrangements are possible if desired. Head 100 is etched to remove seed layer 230 from those portions of head 100 not protected by upper coil layer 235. For clarity in FIG. 9A, head 100 is illustrated after seed layer 230 is removed whereas in the cross section of FIG. 9B seed layer 230 is shown. For simplicity, the remaining portions of seed layer 230 are omitted from the subsequent drawings.

Upper coil layer 235 includes a connective strip 237 made of electrically conductive material which couples an end 235A of upper coil layer 235 to the via cap 120 of via connective member 112C. Copper may be used to fabricate connective strip 237. The remaining end 235B of upper coil layer 235 is coupled to lower coil end 190B through open region 205 by a plated connection (not shown) therebetween.

From the above, it will be appreciated that insulative layer 200 performs multiple purposes such as isolating coil layer 190 from coil layer 235, isolating connective strip 237 from the shield and isolating connective strip 195 from later plated shield structures. Insulative layer 200 also provides openings for side pole portions 220 and 225, provides an opening for permitting connection between coil layers 190 and 235, and forms a boundary for the shield structure.

Figure 10A:
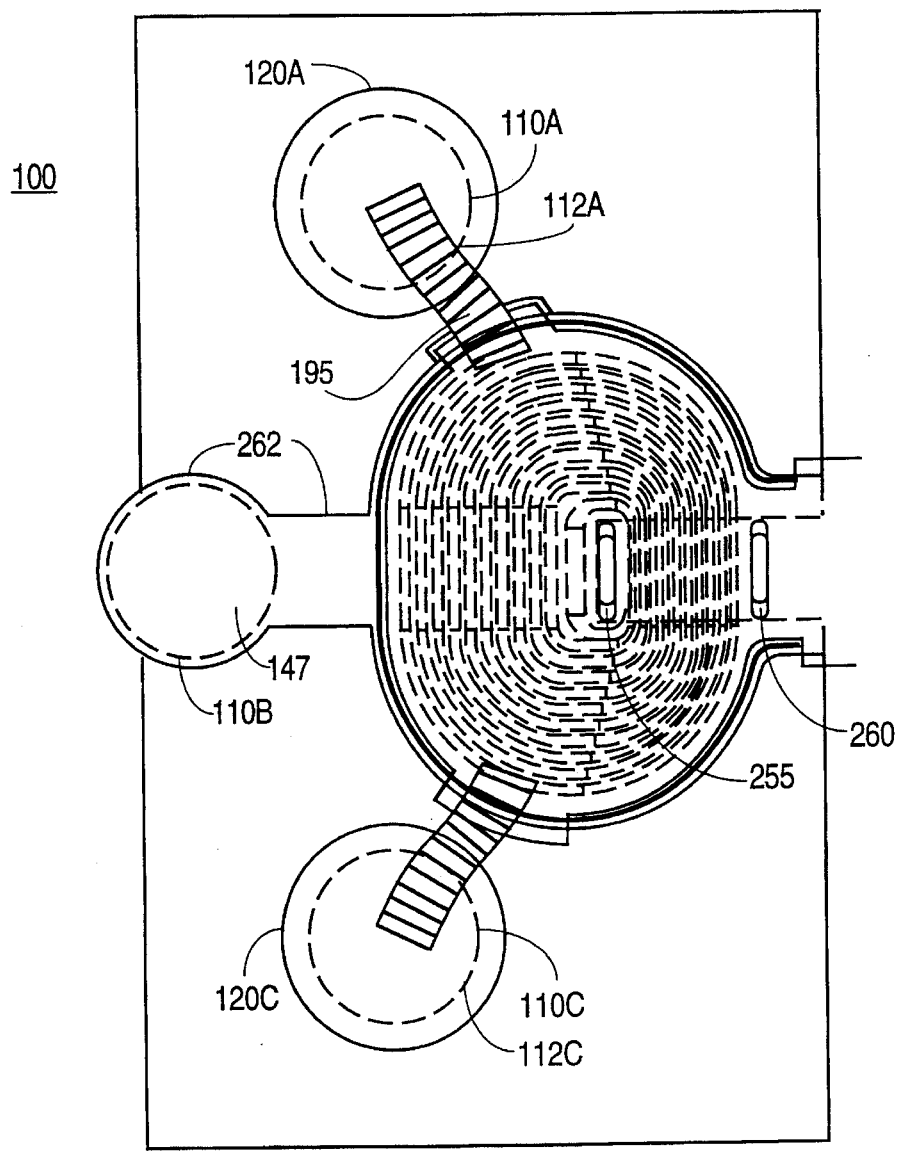
FIG. 10A is a plan view of the magnetic head of FIG. 9A showing the formation of an insulative layer on the upper coil structure.
Figure 10B:
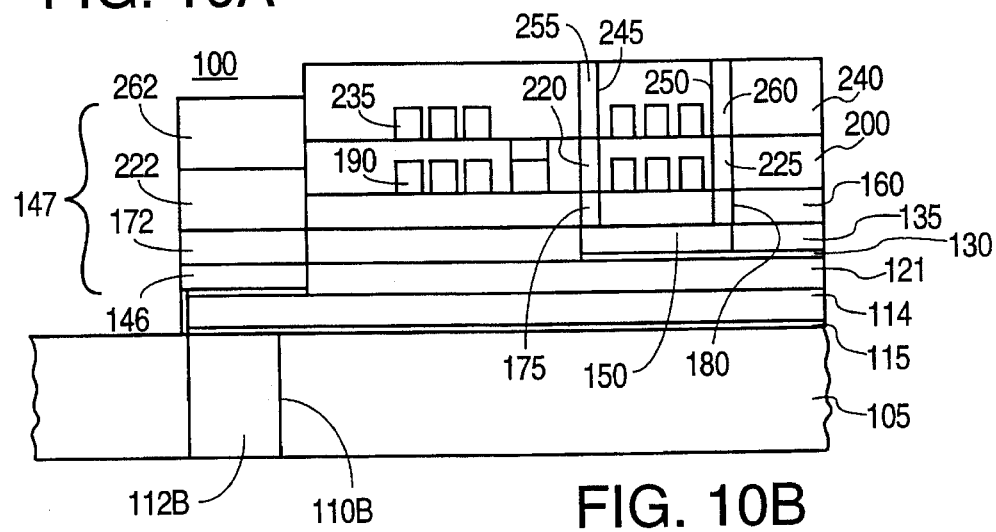
FIG. 10B is a cross sectional view of the magnetic head of FIG. 10A taken along section line 10B—10B.

An insulative layer 240 of photoresist material is deposited on the upper surface of the partially complete head 100 as shown in FIG. 10A and more clearly in FIG. 10B. Insulative layer 240 is patterned to include open regions 245 and 250. Layer 240 is electron beam cured. Magnetic side pole portions 255 and 260 are then respectively plated into open regions 245 and 250 up to a level even with insulative layer 240 as shown in FIG. 10B.

At the same time that side pole portions 255 and 260 are plated, side shield layer 262 is plated atop side shield layer 222. To plate magnetic side pole portions 255 and 260 and side shield layer 262, the remainder of the upper surface of head 100 except for the regions in which these structures are to be formed is covered with a patterned photoresist layer (not shown). The photoresist layer is removed subsequent to plating, thus leaving the structure shown in FIG. 10B.

Figure 11A:
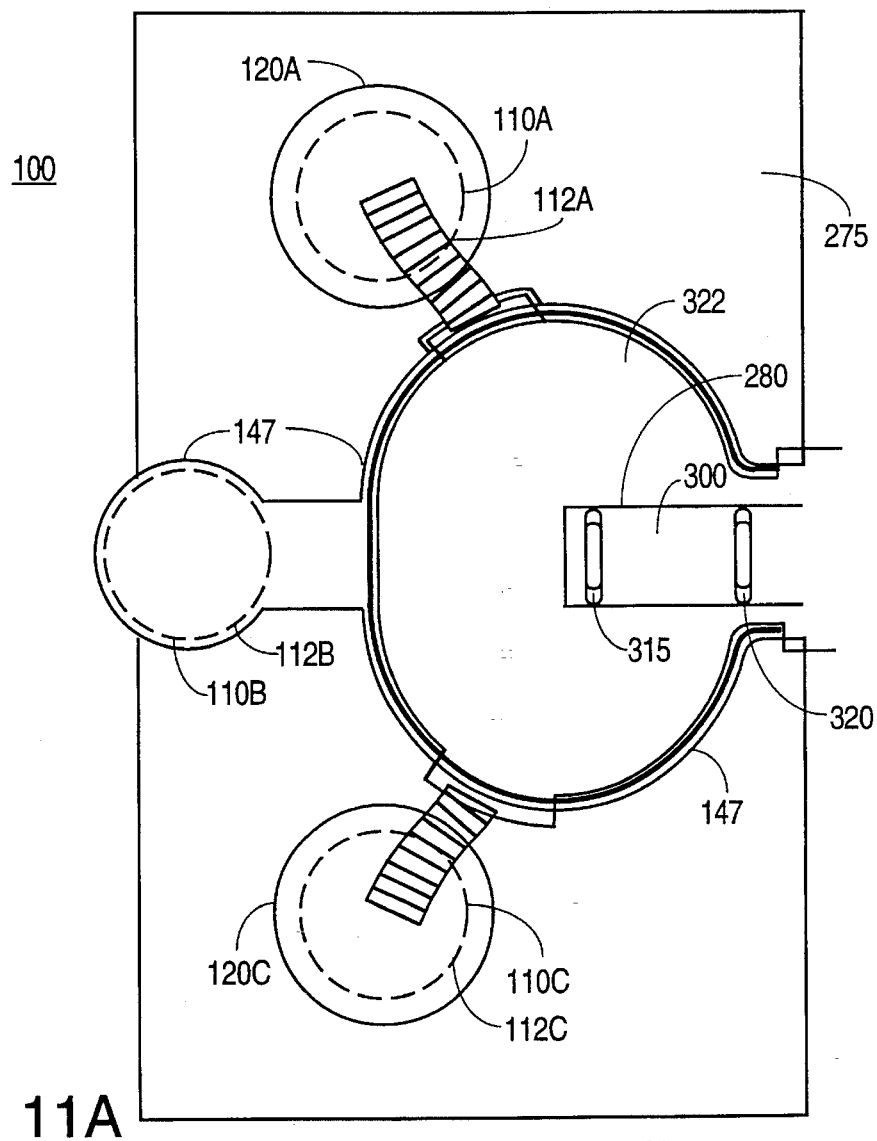
FIG. 11A is a plan view of the magnetic head of FIG. 10A showing formation of a cover shield and a pedestal.

A seed layer 275 of material suitable for plating, such as CrCu material for example, is sputtered, patterned and etched on the upper surface of the head structure 100 as shown in FIG. 11A. More specifically, seed layer 275 is patterned to form an opening 280 around side pole portions 255 and 260 as shown.

Figure 11B:
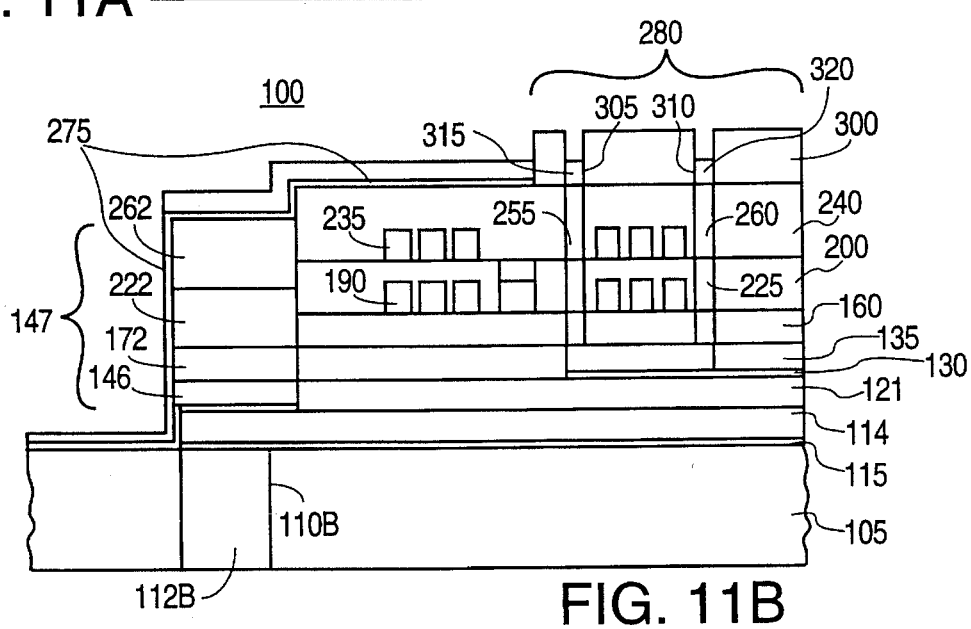
FIG. 11B is a cross sectional view of the magnetic head of FIG. 11A taken along section line 11B—11B.

An electrically insulative layer of photoresist is patterned and electron beam cured on the upper surface of head 100 to form a protrusion or pedestal 300 within open region 280 as shown in FIG.'s 11A and 11B. (Seed layer 275 is not shown in FIG. 11B because other structures have been added which obscure or cover seed layer 275.) Pedestal 300 extends above the surrounding head structures. Insulative pedestal 300 exhibits a substantially rectangular geometry with rounded corners in this particular embodiment, although other geometries such as circular and elliptical may be used if desired. Insulative pedestal 300 is patterned to include open regions 305 and 310 in which side poles portions 315 and 320 are plated. At the same time that side pole portions 315 and 320 are plated, a cover shield 322 is also plated as shown in FIG. 11A and 11B. Cover shield 322 overlaps and extends from side shield 147 to substantially cover the upper surface of the region above coil layers 190, 235 except for pedestal 300. The completed side shield 147 substantially encircles and surrounds the multiple insulative layers which form the main body of head 100. Side shield 147 appears as a vertical wall in FIG. 11B, namely a vertical wall which substantially surrounds or encircles the coil structure of the head as shown in FIG. 11A. Cover shield 322 acts as a substantially sealing cover for side shield 147. Cover 322 meets with the uppermost layer of side shield 147 as shown in FIG. 11B.

To plate side pole portions 315 and 320 and cover shield 322, the remainder of the upper surface 100 except for these regions is masked off with protective layer photoresist (not shown) to restrict plating to these regions. Plating is then conducted and the photoresist is removed. In actual practice, side pole portions 315 and 320 are initially plated to a depth which partially fills pedestal open regions 305 and 310 as shown. This leaves room within open regions 305 and 310 for plating additional plating material for side pole portions 315 and 320 at the time when frame 325 is plated as now discussed.

Figure 12A:
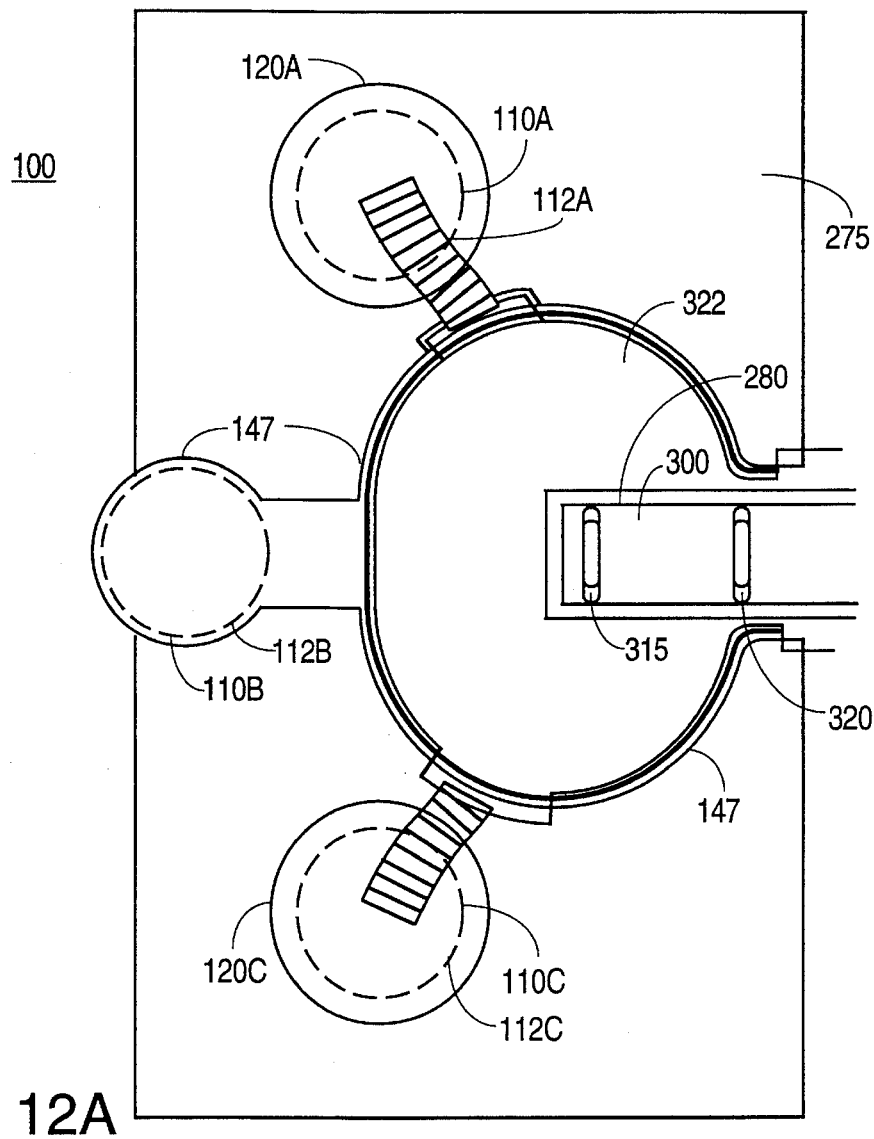
FIG. 12A is a plan view of the magnetic head of FIG. 11A showing formation of a frame for the pedestal.
Figure 12B:
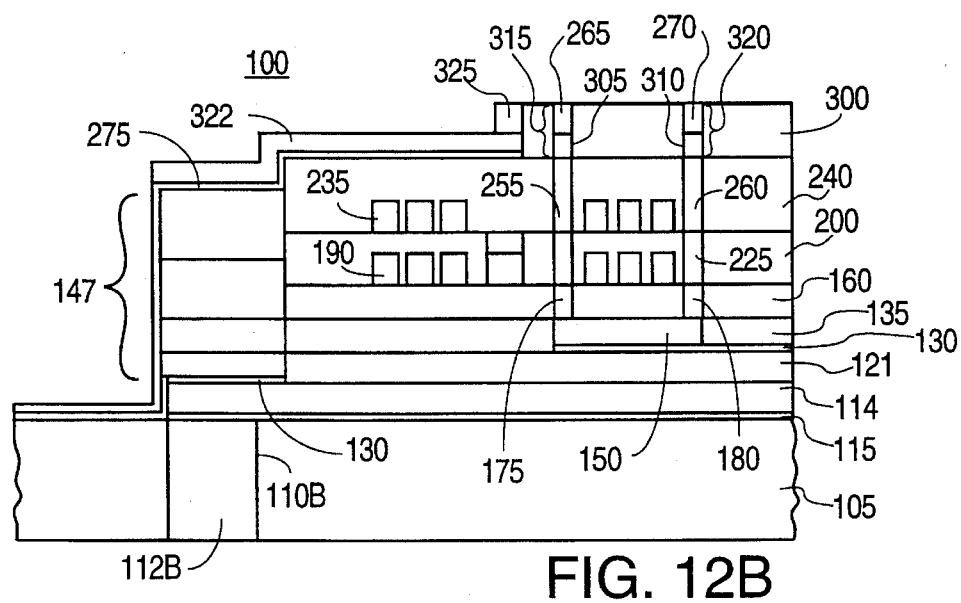
FIG. 12B is a cross sectional view of the magnetic head of FIG. 12A taken along section line 12B—12B.

To provide pedestal 300 with structural integrity, a frame 325 is plated around pedestal 300 as shown in FIG.12A and 12B. Frame 325 is plated at the same time that the remainder of open regions 305 and 310 are plated up to the top of pedestal 300. To plate frame 325 and side pole portions 315 and 320, the remainder of the upper surface of head 100 is covered with a layer of photoresist (not shown) but for these areas. Plating with a suitable plating material, such as the magnetic material NiFe, is then conducted. Platable material other than NiFe magnetic material can also be used for plating frame 325. For example, metallic material such as NiP as described below can be used to fabricated frame 325. However, if the same material which is used to plate side pole portions 315 and 320 is also used to plate frame 325, then side pole portions 315 and 320 and frame 325 can advantageously be formed at the same time. Frame 325 exhibits substantially the same shape as pedestal 300 although frame 325 is somewhat larger than pedestal 300. Frame 325 and side pole portions 315 and 320 are plated level with the top of pedestal 300.

Alternatively, frame 325 and side pole portions 315 and 320 can be formed in a different manner. For example, side pole portions 315 and 320 can be completely formed in a single plating step rather than two steps. In this instance, complete side pole portions 315 and 320 are plated level with the top of pedestal 300 in one step. Frame 325 is then patterned with non-magnetic NiP alloy up to a level even with the top of pedestal 300 in a separate step. To pattern frame 325 by this alternative method, after side pole portions 315 and 320 are plated, the upper surface of head 100 except for an open region in which frame 325 is to be formed is covered with a layer of photoresist (not shown). Frame 325 is then plated in the photoresist open region and the photoresist layer is subsequently removed.

Magnetic side pole portions 175, 220, 255 and 315 together make up a first side pole which is shown collectively as side pole 265 in FIG. 12B. Magnetic side pole portions 180, 225, 260 and 320 together make up a second magnetic side pole which is shown collectively as side pole 270 in FIG. 16B. Side poles 265 and 270 are "layered" structures in that they are formed from a plurality of layers of the same material which are built up, layer upon layer, to form the resultant side pole structure. Side shield 147 is also a "layered" structure in that it is built up from a plurality of shield layers.

The portion of seed layer 275 which is outside the vertical shield wall 147 is removed by photomasking and etching. For clarity, the subsequent figures focus on pedestal 300 and the structures which are fabricated on pedestal 300.

Figure 13A:
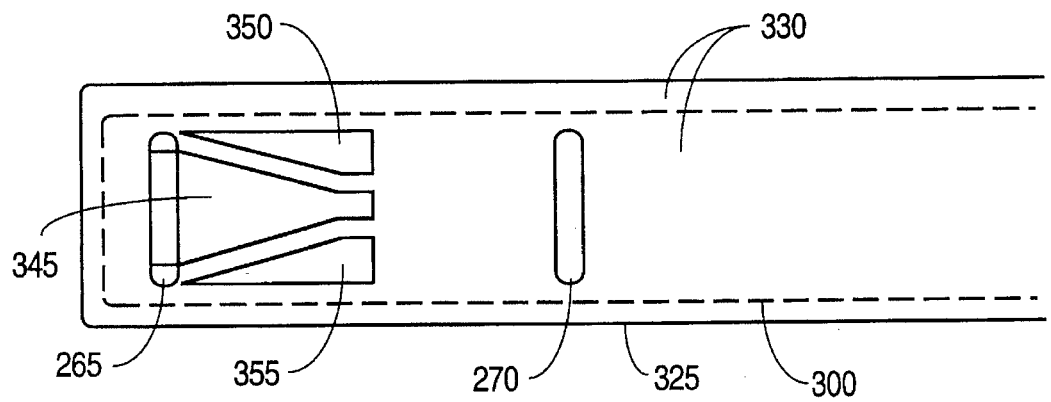
FIG. 13A is a plan view of the magnetic head showing the addition of a first magnetic pole at the top of the magnetic yoke structure of the head.
Figure 13B:
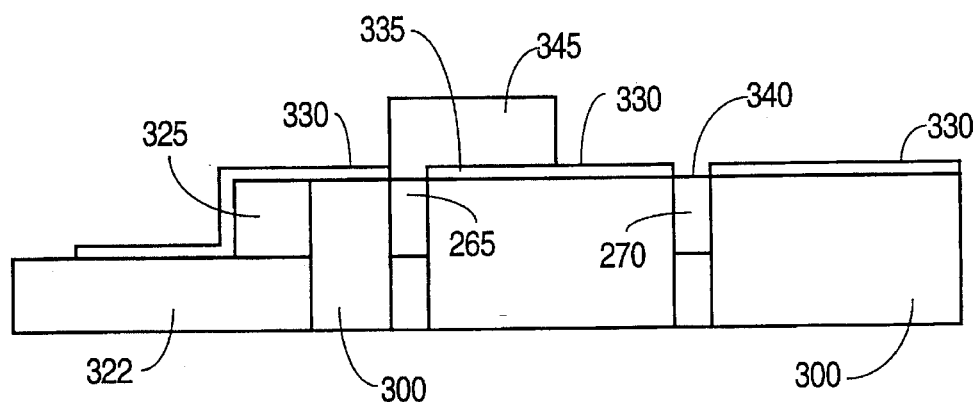
FIG. 13B is a cross sectional view of the magnetic head of FIG. 13A taken along section line 13B—13B.

Referring now to FIG. 13A and 13B, a layer of photoresist (not shown) is patterned on the upper surface of head 100 to cover all areas except for the region where seed layer 330 is to be formed. The desired location of seed layer 330 is shown in FIG. 13B. For example, the photoresist layer covers the region immediately above side poles 265 and 270. The photoresist layer further covers and protects the areas of head 100 outside of frame 325 except for a portion of shield cover 322 adjacent frame 325. A Cr-NiV seed layer 330 is sputtered on the exposed upper surfaces of head 100 leaving a sputtered Cr-NiV film atop head 100. The photo-resist layer is stripped, lifting off the sputtered Cr-NiV film from the region of the head above side poles 265 and 270 and from the protected area outside of frame 325. Seed layer 330 is thus formed as shown in FIG. 13B. During this photoresist stripping step, the photoresist above side poles 265 and 270 is removed, thus forming open regions 335 and 340 as shown in FIG. 13A. Side poles 265 and 270 are thus exposed.

A first magnetic pole 345 is patterned at the top of side pole 265 as shown in FIG. 13A and 13B. First magnetic pole 345 is fabricated by plating a magnetic material such as NiFe on side pole 265 and on a portion of seed layer 330 adjacent side pole 265. Magnetic control regions 350 and 355, which are adjacent both sides of first magnetic pole 345, may be patterned and plated at the same time as first pole 345. Magnetic control regions 350 and 355 serve to better control local plating current density which influences NiFe composition and enhances the effect of the easy axis magnetic orienting field of between approximately 1000 Gauss to approximately 10,000 Gauss, provided by an external magnet during the first magnetic pole plating step, to give a desired magnetic domain structure in the magnetic pole piece. Head 100 is exposed to the same magnetic field throughout the duration of building up the various magnetic layers thereof.

Figure 14A:
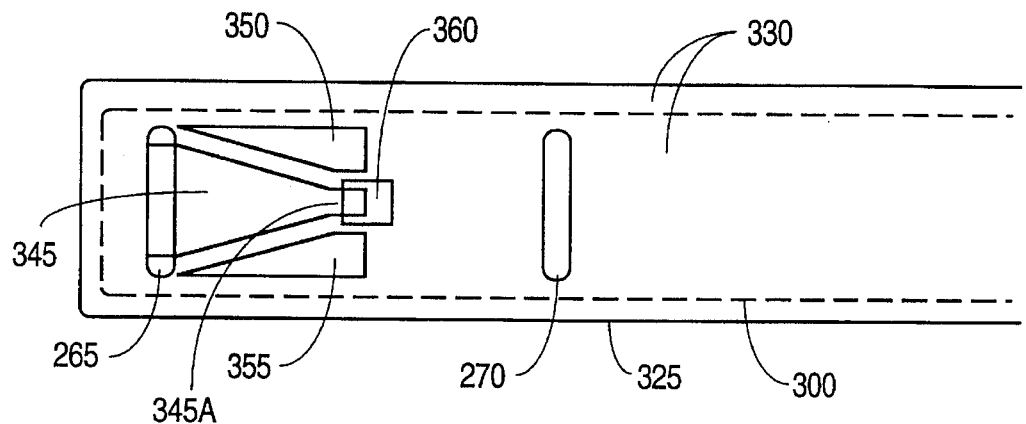
FIG. 14A is a plan view of the magnetic head showing the addition of a gap region at the top of the magnetic yoke structure of the head.
Figure 14B:
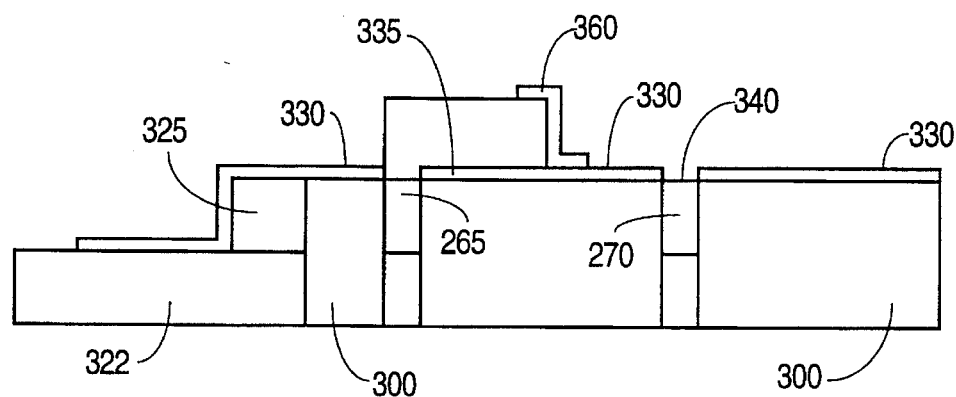
FIG. 14B is a cross sectional view of the magnetic head of FIG. 14A taken along section line 14B—14B.

A substantially rectangular gap region 360 of non-magnetic material is plated adjacent pole end 345A as shown in FIG. 14A and the head cross section of FIG. 14B. One non-magnetic material which may be used to fabricate gap region 360 is NiP. Alternatively, a hard material such as diamond-like carbon, DLC, is deposited, patterned an etched to form gap region 360.

A second magnetic pole 365 is patterned and plated at side pole 270 at the top of magnetic yoke 145 as shown in FIG.'s 15A and 15B. Second magnetic pole 365 includes a pole end 365A which is situated adjacent pole end 345A and which is separated from pole end 345A by gap region 360. It is noted that pole 345 becomes narrower from side pole 265 to pole end 345A. Similarly, pole 365 becomes narrower from side pole 270 to pole end 365A. This gives poles 345 and 365 a bow tie-like appearance in this particular embodiment. Other pole geometries may be used as well. Pole ends 345A and 365A are alternatively referred to as gap ends. It is noted that magnetic yoke 145 is collectively made up of bottom magnetic layer 150, side poles 265 and 270, and magnetic poles 345 and 365.

Figure 15A:
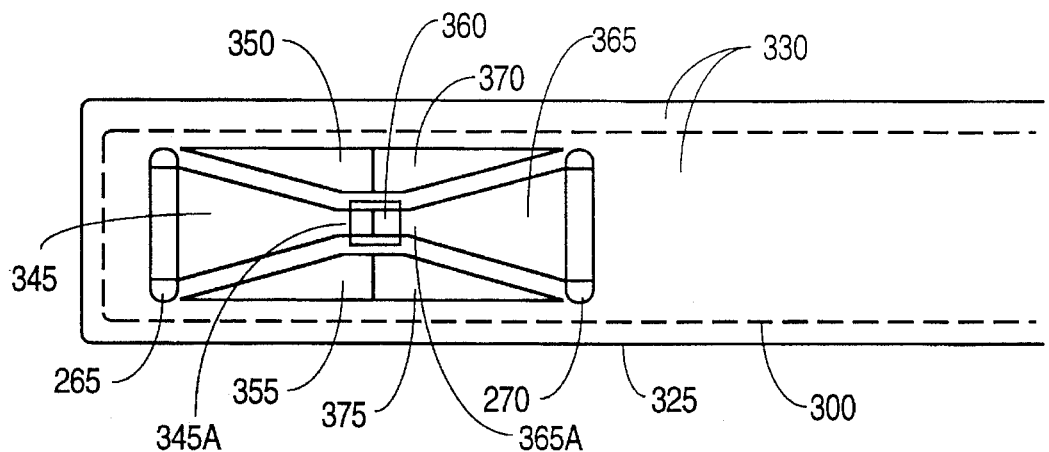
FIG. 15A is a plan view of the magnetic head showing the addition of a second magnetic pole at the top of the magnetic yoke structure of the head.

Magnetic control regions 370 and 375 are patterned and plated adjacent both sides of second pole 365 to enhance magnetic control as shown in FIG. 15A. Control regions 350, 355, 370 and 375 are fabricated from a magnetic material such as the material used to fabricate second magnetic pole 365. For optimal wear performance, the area of NiFe exposed to the recording media should be minimized. Thus, to avoid possible magnetic effects that may degrade recording performance, NiFe plated magnetic control regions 350, 355, 370 and 375 are patterned and etched away leaving a pole geometry seen in FIG. 16A.

Figure 15B:
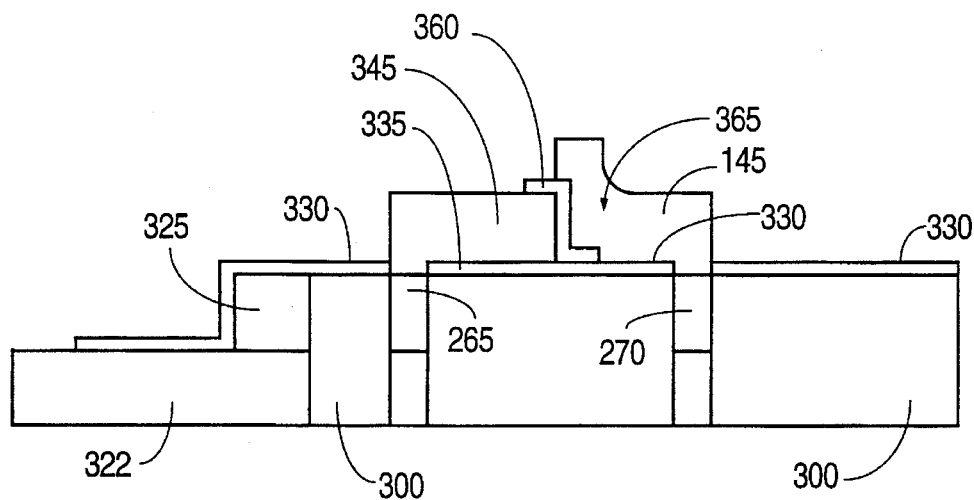
FIG. 15B is a cross sectional view of the magnetic head of FIG. 15A taken along section line 15B—15B.

As seen in FIG. 15B, a portion of seed layer 330 is now situated under first magnetic pole 345 and second magnetic pole 365 while the remaining portion of seed layer 330 is exposed. The exposed portion of seed layer 330 is is permitted to remain on head 100, but for simplicity is omitted from the subsequent drawings.

Figure 16A:
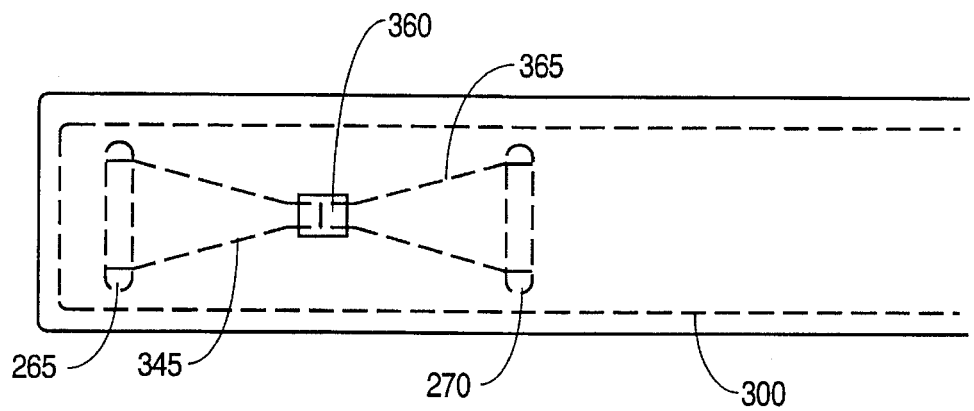
FIG. 16A is a close-up plan view of the side pole and gap region of the magnetic head of FIG. 15A after addition of an adhesion layer and a diamond-like carbon wear layer to the top of the head.
Figure 16B:
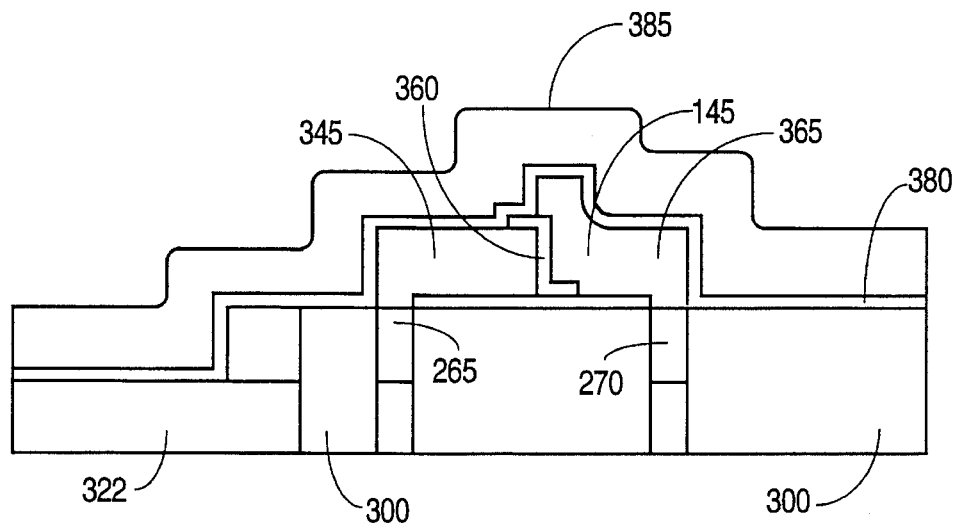
FIG. 16B is a cross sectional view of the magnetic head of FIG. 16A taken along section line 16B—16B.

A silicon adhesion layer 380 is sputtered on the exposed upper surface of head 100 as shown in FIG. 16B. It is noted that the thickness of silicon adhesion layer 380 is generally within the range of approximately 400 Å to approximately 1000 Å. The silicon adhesion layer exhibits a nominal thickness of approximately 600 Å in a preferred embodiment. A layer of hard protective wear material 385, such as diamond-like carbon (DLC), is then deposited on adhesion layer 380. Adhesion layer 380 enables DLC layer 385 to stick to the upper surface of head 100. DLC layer 385 covers at least the top of magnetic yoke 145 and the immediately surrounding area of the head.

As seen in FIG. 16A and more clearly in FIG. 16B, DLC layer 385 covers magnetic yoke 145 and insulative pedestal 300. A hard protective wear material thus covers these important structures. Protective layer 385 exhibits a Knoop hardness greater than 700 Knoop and preferably greater than 800 Knoop. The hardness of protective layer should be within the range of greater than approximately 700 Knoop to approximately 2000 Knoop. One material that is satisfactory for formation of protective wear layer 385 is diamond like carbon (DLC).

Figure 17A:
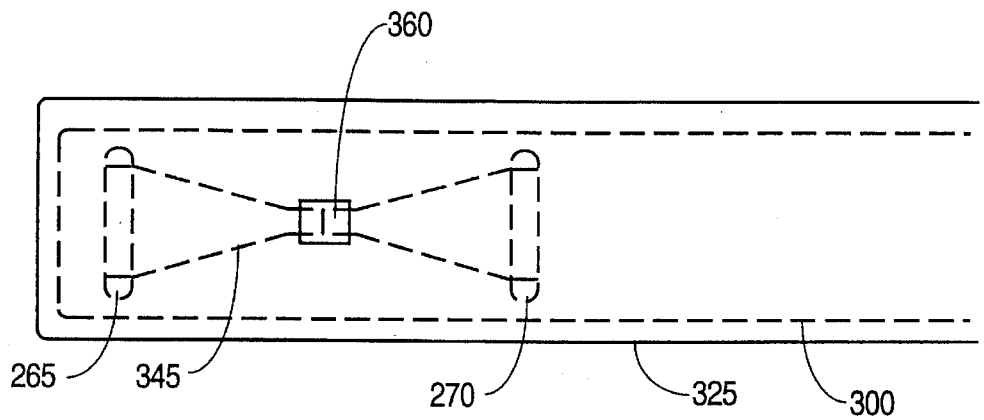
FIG. 17 is a cross sectional view of the magnetic head of FIG. 16B showing the magnetic head after a diamond-like carbon wear layer and adhesion layer are patterned and etched in regions other than the insulative pedestal.
FIG. 17B is a cross sectional view of the magnetic head of FIG. 17A taken along section line 17B—17B.
Figure 17B:
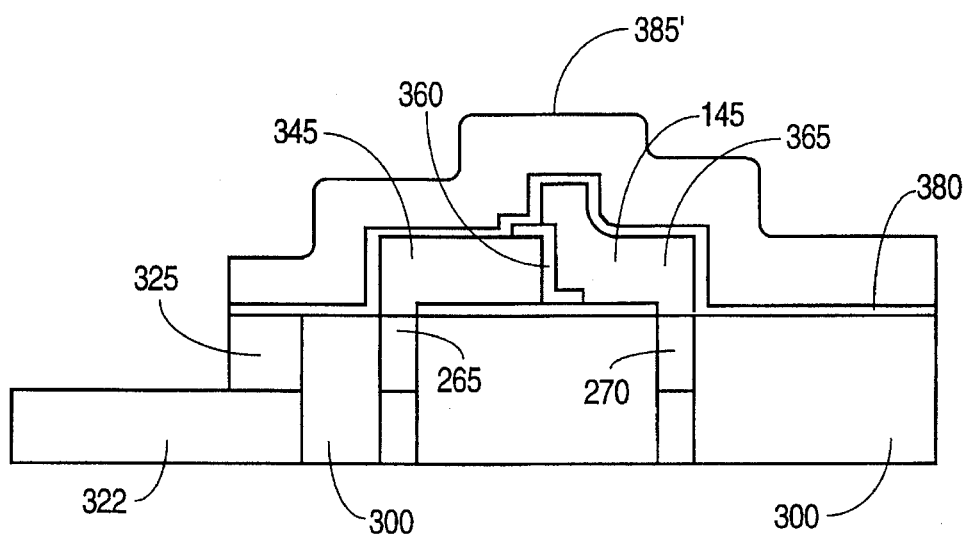

DLC layer 385 is patterned and both DLC layer 385 and adhesion layer 380 are reactive ion etched to leave a DLC wear layer 385' over magnetic yoke 145 and insulative pedestal 300 as shown in FIG. 17B. More specifically, prior to exposing head 100 to this reactive ion etch, the upper surface of head 100 is covered with a layer of photoresist (not shown). The photoresist layer is patterned to include unprotected open regions for those portions of the head external to frame 325. In this manner, when the head is subjected to the reactive ion etch, the portion of DLC layer 385 and adhesion layer 380 external to frame 325 is etched away and the remaining portion of DLC layer 385 is protected and remains as DLC layer 385'. Thus, a DLC wear layer 385' which surrounds pedestal 300 and frame 325 is provided to head 100.

An alternative to the above described photoresist masking approach to patterning DLC layer 385 into DLC layer 385' is to cover head 100 with a metal layer such as chromium. For example, a relatively thin photomask layer (not shown) of chromium is sputtered over the DLC layer. In this particular example, the photomask layer is approximately 500 Å thick. The metal photomask layer is photo-patterned and etched to expose DLC areas which are to be excavated by reactive ion etching. The DLC layer is then reactive ion etched to the desired DLC structure.

More detail is now provided with respect to the formation of DLC protective wear layer 385. Before DLC protective wear layer 385 is actually laid down on silicon adhesion layer 380, adhesion layer 380 is sputter cleaned. In the course of performing this sputter cleaning, approximately 200 Å of the upper surface of silicon adhesion layer 380 is removed. More particularly, the silicon adhesion layer is sputter cleaned in a SAMCO plasma machine, Model No. PD-200D (Plasma Enhanced CVD System For DLC Deposition and Etching), hereafter the "plasma machine". This sputter cleaning is performed with Argon in a plasma within the plasma machine vessel at a pressure of 70 mTorr with 180 watts RF input power at a frequency of 13.56 MHz. The flow rate of Argon is approximately 100 sccm. The partially complete head 100 is situated on a 6 inch diameter cathode (i.e. the energized electrode) of the SAMCO plasma machine, Model PD-200D, for approximately 3 to approximately 4 minutes.

Immediately after the Argon plasma cleaning (sputter etching) is complete, the input power is reduced to 110–150 Watts to the same 6 inch cathode electrode. The Argon source is turned off and a source of liquid hydrocarbon DLC source material is turned on. For example, one DLC source material that may be used is Part No. S-12 available from SAMCO, Sunnyvale, Calif. The pressure within the vessel is approximately 20 approximately 25 mTorr at a flow rate of source material of approximately 25 cm$^3$/min. Although the temperature is not specifically controlled during this process, the wafer on which the head is fabricated is situated on a water-cooled cathode while in the plasma machine. Under these conditions, a DLC deposition rate of approximately 1000 Å/min is obtained which is maintained until the desired DLC thickness is reached, namely approximately 5μ.

DLC fabricated in this manner results in a DLC layer 385 with a Knoop hardness of approximately 800. It is found that DLC layer Knoop hardnesses of greater than 700 up to approximately 2000 Knoop produce and acceptably hard wear layer 385 for wear protection purposes. DLC wear layer 385 is then reactive ion etched as described to form DLC wear layer 385'.

Figure 18A:
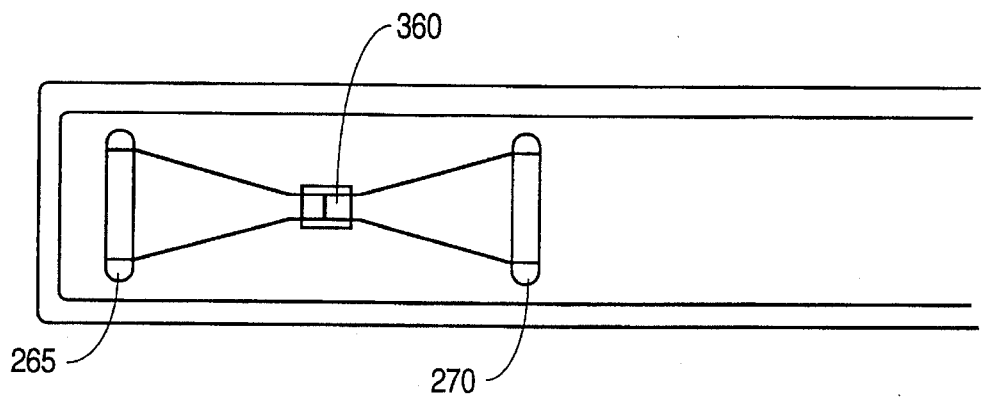
FIG. 18A is a close-up view of the side pole and gap region of the magnetic head when fabrication is complete.
Figure 18B:
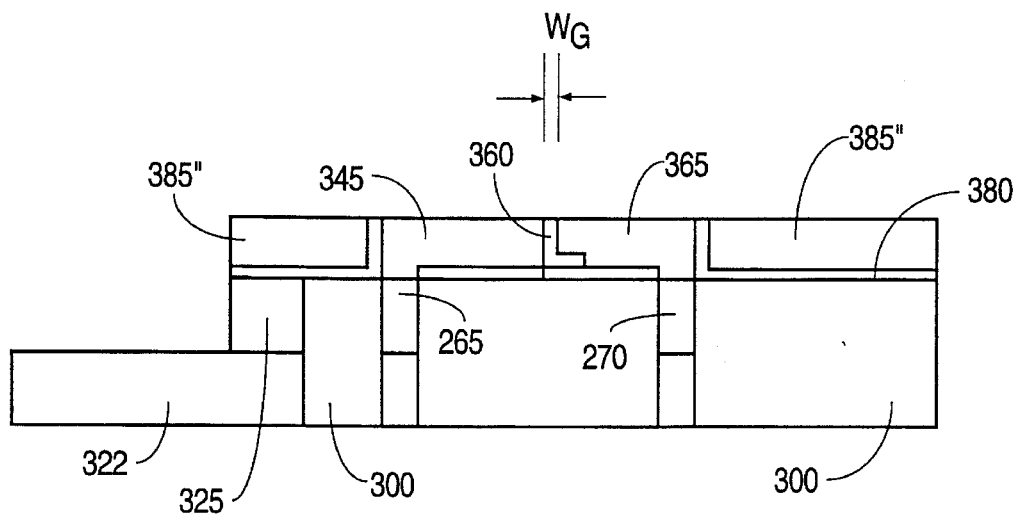
FIG. 18B is a cross sectional view of the magnetic head of FIG. 18A taken along section line 18B—18B.

DLC wear layer 385' is machined or lapped as shown in FIG. 18B to expose magnetic gap region 360 as shown in both FIG. 18A and 18B. A DLC wear layer 385" is thus formed which protects head 100, specifically gap region 360 and magnetic poles 345, 365, from wear when head 100 is brought into contact with a magnetic media for recording or playback purposes. By using the techniques described herein, very narrow gap regions can be produced. The gap width, $W_G$, is defined to be the width of gap region 360, namely the distance between pole end 345A and pole end 365A as seen in FIG. 19B. Typical gap widths for head 100 are approximately 0.2 microns to approximately 1 micron.

In this particular embodiment, gap region 360 exhibits a substantially L-shaped cross section.

It is noted that in one embodiment of the invention, the upper magnetic pole elements 345 and 365 are plated directly on magnetic side poles 265 and 270, respectively, Advantageously, no intervening structures are required between upper magnetic pole element 345 and magnetic side pole 265 or between magnetic pole element 365 and magnetic side pole 270. Magnetic pole elements 345 and 365 are thus integral with magnetic side poles 265 and 270, respectively.

In the embodiment of the invention described above, magnetic yoke 145 is electrically isolated from the shield. This isolation is achieved by an insulative base layer 121 which is situated between shield layer 114 and seed layer 130 upon which bottom magnetic layer 150 of yoke 145 rests. FIG.'s. 19A and 19B show a modification to the head 100 described above wherein magnetic yoke 145 is electrically coupled to the shield. The modified head is designated head 100'. To fabricate such a head 100', the head is fabricated as described earlier up to and including the step of forming shield 114. The upper surface of partially complete head 100' is then patterned with an insulative layer 135 of photoresist to include on opening at the location where bottom magnetic layer 150 will be plated and an opening where bottom side shield layer 146 will be plated. Plating of bottom magnetic layer 150 and bottom side shield layer 146 is then conducted in the respective openings of photoresist layer 135 to form the partially complete head structure 100' shown in FIG. 19B.

In comparing the partially complete head 100 of FIG. 5B with the partially complete head 100' of FIG. 19B, it is noted that in FIG. 5B the level of bottom side shield layer 146 is below that of insulative layer 135, whereas in FIG. 19B the level of bottom side shield layer 146 is even or planar with insulative layer 135. In view of this difference, the remaining upper layers of head 100' are fabricated in substantially the same manner as with head 100 with the following modification. Since bottom side shield layer 146 is already planar with insulative layer 135 in head 100' as shown in FIG. 19B, the side shield 147 of the head 100' embodiment will omit side shield layer 172 of FIG. 7B. Other than this modification, subsequent fabrication of head 100' continues as before.

More detail with respect to the formation of structures within head 100 are found in copending U.S. patent application entitled "THIN FILM MAGNETIC HEAD INCLUDING LAYERED MAGNETIC SIDE POLES" by Malhotra et al U.S. application No. 08/297,186)., filed concurrently herewith and assigned to the same assignee as the subject patent application, the disclosure thereof being incorporated herein by reference.

More information with respect to the formation of the upper pole structure of the thin film head is found in the U.S. patent application entitled "THIN FILM MAGNETIC HEAD INCLUDING DURABLE WEAR LAYER AND NON-MAGNETIC GAP STRUCTURE" by Gray et al. (U.S. application No. 08/296,821), filed concurrently herewith and assigned to the same assignee as the subject patent application, the disclosure thereof being incorporated herein by reference.

Additional information with respect to another upper pole structure which can be used in the fabrication of the thin film head is found in the U.S. patent application entitled "THIN FILM MAGNETIC HEAD INCLUDING A DURABLE WEAR LAYER AND GAP STRUCTURE" by Gray et al.

(U.S. application No. 08/296,840), filed concurrently herewith and assigned to the same assignee as the subject patent application, the disclosure thereof being incorporated herein by reference.

While a thin film magnetic head apparatus has been described above, it is clear that a method of fabricating such a magnetic head apparatus is also disclosed. Briefly, a method of fabricating a thin film magnetic head is disclosed which includes the step of forming a lower shield layer on the substrate, the lower shield layer including a peripheral edge surface. The method also includes the step of forming an electrically insulative layer on the lower shield layer. The method further includes the step of forming a lower magnetic layer atop the insulative layer, the lower magnetic layer having first and second ends. The method also includes the step of forming first and second side pole members of magnetic material at the first and second ends, respectively, of the lower magnetic layer, the first and second side pole members being built up from a plurality of layers of magnetic material deposited layer upon layer, the first and second side pole members including tops and bottoms. The method further includes the step of forming a coil structure around one of the first and second side pole members while the first and second side pole members are being formed, the coil structure being separated from the first and second side pole members by an layered insulative body. The method also includes the step of forming an insulative pedestal at the tops of the first and second side pole members, the insulative pedestal extending above the plane of the insulative body below and surrounding the tops of the first and second side pole members. The method further includes the step of forming a layered side shield atop the peripheral edge surface of the lower shield layer and substantially surrounding the insulative body. The method still further includes the step of forming a shield cover situated atop the side shield and covering the insulative body and coil structure, the shield cover including an opening through which the pedestal protrudes. The method also includes the step of forming first and second upper magnetic pole elements at the tops of the first and second side pole members, respectively. The method further includes the step of forming a gap region of nonmagnetic material between the first and second upper magnetic pole elements.

The foregoing has described a thin film magnetic head with an integral shield structure for reducing the undesired effects of exposure to noise sources. The disclosed head exhibits a narrow gap width, $W_G$, within the range of approximately 0.2 microns to approximately 1 micron which results in correspondingly high density magnetic recording capabilities. Advantageously, the disclosed thin film head can be fabricated in large quantities using thin film semiconductor fabrication equipment.

While only certain preferred features of the invention have been shown by way of illustration, many modifications and changes will occur. It is, therefore, to be understood that the present claims are intended to cover all such modifications and changes which fall within the true spirit of the invention.

What is claimed is:

1. A thin film magnetic head comprising:

a substrate;

a bottom shield layer situated on the substrate and including a peripheral edge surface;

an electrically insulative layer situated on the bottom shield layer;

a lower magnetic layer situated on the insulative layer and having first and second ends;

first and second layered side pole members of magnetic material situated at the first and second ends, respectively, of the lower magnetic layer, the first and second side pole members including tops and bottoms;

a layered electrically insulative body situated about the first and second side poles;

a coil structure situated within the insulative body and around one of the first and second side pole members;

an insulative pedestal situated at the tops of the first and second side pole members, the insulative pedestal extending above the plane of the insulative body below and surrounding the tops of the first and second side pole members;

a layered side shield situated atop the peripheral edge surface of the bottom shield layer and substantially surrounding the insulative body;

a shield cover situated atop the side shield and covering the insulative body and coil structure, the shield cover including an opening through which the pedestal protrudes;

a first upper magnetic pole element situated at the upper end of the first magnetic side pole and including a first gap end facing the second magnetic side pole;

a second upper magnetic pole element situated at the upper end of the second magnetic side pole and including a second gap end facing the first gap end; and a gap region of nonmagnetic material situated between the first gap end and the second gap end.

2. The thin film magnetic head of claim 1 wherein the bottom shield layer, the side shield and the shield cover are fabricated from electrically conductive material.

3. The thin film magnetic head of claim 1 wherein the lower magnetic layer, the first side pole member, the second side pole member, the first upper magnetic pole element, the second upper magnetic pole element and the gap region together exhibit a substantially rectangular cross section.

4. The thin film magnetic head of claim 1 wherein the first upper magnetic pole element and the second upper magnetic pole element together exhibit a bow-tie like geometry.

5. The thin film magnetic head of claim 1 wherein the gap region is substantially L-shaped in cross section.

6. The thin film magnetic head of claim 1 further comprising a via in the substrate below the side shield, the via being filled with electrically conductive material.

7. A thin film magnetic head comprising:

a substrate;

a bottom shield layer situated on the substrate and including a peripheral edge surface;

a lower magnetic layer situated on, and electrically coupled to, the bottom shield layer, the lower magnetic layer including having first and second ends;

first and second layered side pole members of magnetic material situated at the first and second ends, respectively, of the lower magnetic layer, the first and second side pole members including tops and bottoms;

a layered electrically insulative body situated about the first and second side poles;

a coil structure situated within the insulative body and around one of the first and second side pole members;

an insulative pedestal situated at the tops of the first and second side pole members, the insulative pedestal extending above the plane of the insulative body below and surrounding the tops of the first and second side pole members;

a layered side shield situated atop the peripheral edge surface of the bottom shield layer and substantially surrounding the insulative body;

a shield cover situated atop the side shield and covering the insulative body and coil structure, the shield cover including an opening through which the pedestal protrudes;

a first upper magnetic pole element situated at the upper end of the first magnetic side pole and including a first gap end facing the second magnetic side pole;

a second upper magnetic pole element situated at the upper end of the second magnetic side pole and including a second gap end facing the first gap end; and a gap region of nonmagnetic material situated between the first gap end and the second gap end.

8. The thin film magnetic head of claim 7 wherein the bottom shield layer, the side shield and the shield cover are fabricated from electrically conductive material.

9. The thin film magnetic head of claim 7 wherein the lower magnetic layer, the first side pole member, the second side pole member, the first upper magnetic pole element, the second upper magnetic pole element and the gap region together exhibit a substantially rectangular cross section.

10. The thin film magnetic head of claim 7 wherein the first upper magnetic pole element and the second upper magnetic pole element together exhibit a bow-tie like geometry.

11. The thin film magnetic head of claim 7 wherein the gap region is substantially L-shaped in cross section.

12. The thin film magnetic head of claim 7 further comprising a via in the substrate below the side shield, the via being filled with electrically conductive material.

13. A method of fabricating a thin film magnetic head on a substrate comprising the steps of:

forming a lower shield layer on the substrate, the lower shield layer including a peripheral edge surface;

forming an electrically insulative layer on the lower shield layer;

forming a lower magnetic layer atop the insulative layer, the lower magnetic layer having first and second ends;

forming first and second side pole members of magnetic material at the first and second ends, respectively, of the lower magnetic layer, the first and second side pole members being built up from a plurality of layers of magnetic material deposited layer upon layer, the first and second side pole members including tops and bottoms;

forming a coil structure around one of the first and second side pole members while the first and second side pole members are being formed, the coil structure being separated from the first and second side pole members by an layered insulative body;

forming an insulative pedestal at the tops of the first and second side pole members, the insulative pedestal extending above the plane of the insulative body below and surrounding the tops of the first and second side pole members;

forming a layered side shield atop the peripheral edge surface of the lower shield layer and substantially surrounding the insulative body;

forming a shield cover situated atop the side shield and covering the insulative body and coil structure, the shield cover including an opening through which the pedestal protrudes;

forming first and second upper magnetic pole elements at the tops of the first and second side pole members, respectively, and forming a gap region of nonmagnetic material between the first and second upper magnetic pole elements.

14. The method of fabricating a thin film magnetic head of claim 13 further comprising the step of:

forming, after the step of forming an insulative layer, a seed layer including first and second portions, the first portion of the seed layer being situated on the insulative layer, the second portion of the seed layer being situated on a portion of the lower shield layer which is not covered by the insulative layer.

15. The method of fabricating a thin film magnetic head of claim 14 wherein the step of forming a lower magnetic layer atop the insulative layer includes the step of plating the lower magnetic layer on the first portion of the seed layer.

16. The method of fabricating a thin film magnetic head of claim 15 wherein the side shield includes a bottom layer, the method further comprising the step of plating the bottom layer of the side shield on the second portion of the seed layer simultaneously with plating the lower magnetic layer on the first portion of the seed layer.

17. The method of fabricating a thin film magnetic head of claim 16 wherein the first and second side pole members each include a plurality of layers, the method further comprising the step of plating a plurality of layers of the first and second side poles and plating a plurality of layers of the side shield, such that each time a side shield layer is plated, corresponding first and second side pole layers are plated 18. A method of fabricating a thin film magnetic head on a substrate comprising the steps of:

forming a lower shield layer on the substrate, the lower shield layer including a peripheral edge surface;

forming a lower magnetic layer atop the lower shield layer, the lower magnetic layer having first and second ends;

forming first and second side pole members of magnetic material at the first and second ends, respectively, of the lower magnetic layer, the first and second side pole members being built up from a plurality of layers of magnetic material deposited layer upon layer, the first and second side pole members including tops and bottoms;

forming a coil structure around one of the first and second side pole members while the first and second side pole members are being formed, the coil structure being separated from the first and second side pole members by an layered insulative body;

forming an insulative pedestal at the tops of the first and second side pole members, the insulative pedestal extending above the plane of the insulative body below and surrounding the tops of the first and second side pole members;

forming a layered side shield atop the peripheral edge surface of the lower shield layer and substantially surrounding the insulative body;

forming a shield cover situated atop the side shield and covering the insulative body and coil structure, the shield cover including an opening through which the pedestal protrudes;

forming first and second upper magnetic pole elements at the tops of the first and second side pole members, respectively, and forming a gap region of nonmagnetic material between the first and second upper magnetic pole elements.

19. The method of fabricating a thin film magnetic head of claim 18 wherein the step of forming a lower magnetic layer atop the lower shield layer includes the step of plating the lower magnetic layer on the lower shield layer.

20. The method of fabricating a thin film magnetic head of claim 19 wherein the side shield includes a bottom layer, the method further comprising the step of plating the lower magnetic layer on a portion of the lower shield layer and simultaneously plating the bottom layer of the side shield on the lower shield layer.

21. The method of fabricating a thin film magnetic head of claim 20 wherein the first and second side pole members each include a plurality of layers, the method further comprising the step of plating a plurality of layers of the first and second side poles and plating a plurality of layers of the side shield, such that each time a side shield layer is plated, corresponding first and second side pole layers are plated.

* * * * *